United States Patent
Ittogi

(10) Patent No.: US 9,407,439 B2
(45) Date of Patent: Aug. 2, 2016

(54) AUTHENTICATION SYSTEM AND AUTHENTICATION CODE CONVERTOR

(71) Applicant: CANON KABUSHIKI KAISHA, Tokyo (JP)

(72) Inventor: Hirotaka Ittogi, Susono (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/156,625

(22) Filed: Jan. 16, 2014

(65) Prior Publication Data

US 2014/0205095 A1    Jul. 24, 2014

(30) Foreign Application Priority Data

Jan. 24, 2013 (JP) ................................ 2013-010800

(51) Int. Cl.
*H04N 1/44* (2006.01)
*H04L 9/30* (2006.01)
*H04L 9/32* (2006.01)

(52) U.S. Cl.
CPC ......... *H04L 9/30* (2013.01); *H04L 9/321* (2013.01); *H04L 9/3271* (2013.01); *H04L 2209/76* (2013.01)

(58) Field of Classification Search
CPC ... H04N 1/4486; H04N 1/444; H04N 1/4426; G06F 21/608; G09C 5/00
USPC ....................................................... 380/243
See application file for complete search history.

(56) References Cited

U.S. PATENT DOCUMENTS

| 7,650,499 | B2 | 1/2010 | Ittogi | |
| 2007/0192599 | A1* | 8/2007 | Kato et al. | 713/168 |
| 2008/0256459 | A1* | 10/2008 | Sekiya | 715/741 |

(Continued)

FOREIGN PATENT DOCUMENTS

JP        200076063 A      3/2000

OTHER PUBLICATIONS

IS/IEC 9797-1: INformation technology—Security techniques—Message Authentication Codes (MACs)—Part 1: Mechanisms using a block cipher, Mar. 1, 2011.

(Continued)

*Primary Examiner* — Kambiz Zand
*Assistant Examiner* — Stephen Sanders
(74) *Attorney, Agent, or Firm* — Fitzpatrick, Cella, Harper & Scinto

(57) ABSTRACT

The authentication system includes a to-be-authenticated device for generating a first authentication data; an authentication code convertor for converting the first authentication data generated by the to-be-authenticated device into a second authentication data; and an authentication device for performing authentication of the to-be-authenticated device based on the second authentication data. The first authentication data includes an authentication code obtained by encrypting challenge data output from the authentication device and input to the to-be-authenticated device through the authentication code convertor and predetermined data included in the to-be-authenticated device in accordance with an encryption method using a first encryption key; and the predetermined data included in the to-be-authenticated device. The second authentication data includes an authentication code obtained by encrypting the challenge data output from the authentication device and input to the authentication code convertor and the predetermined data included in the to-be-authenticated device.

20 Claims, 22 Drawing Sheets

(56) References Cited

U.S. PATENT DOCUMENTS

2010/0147945 A1* 6/2010 Bando et al. ............... 235/382.5
2012/0137131 A1* 5/2012 Lu et al. ........................ 713/168
2012/0291062 A1* 11/2012 Pearson et al. ................. 725/31

OTHER PUBLICATIONS

FIPS PUB 186-3: Federal Information Processing Standards Publication Digital Signature Standard (DSS), Jun. 2009.

* cited by examiner

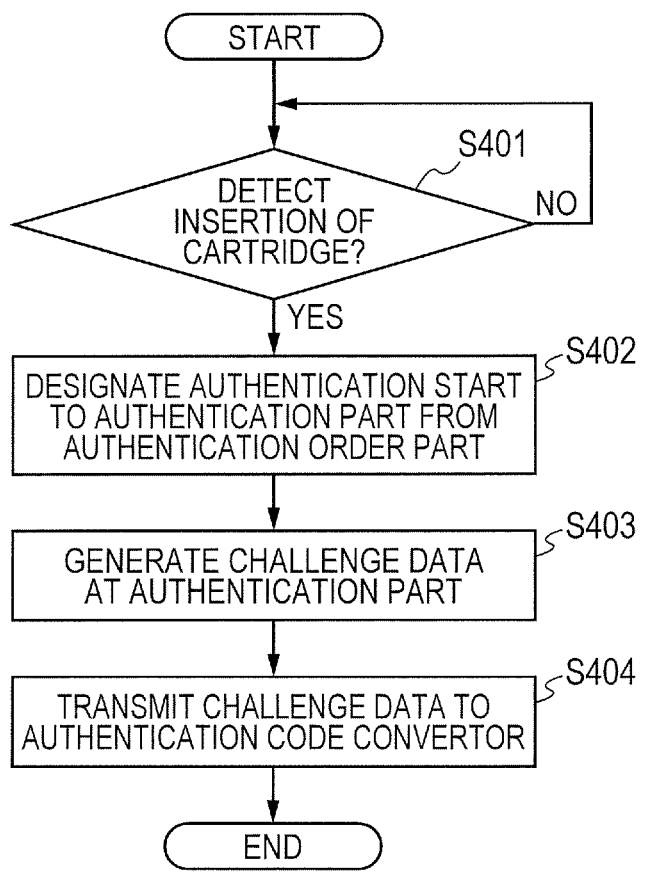

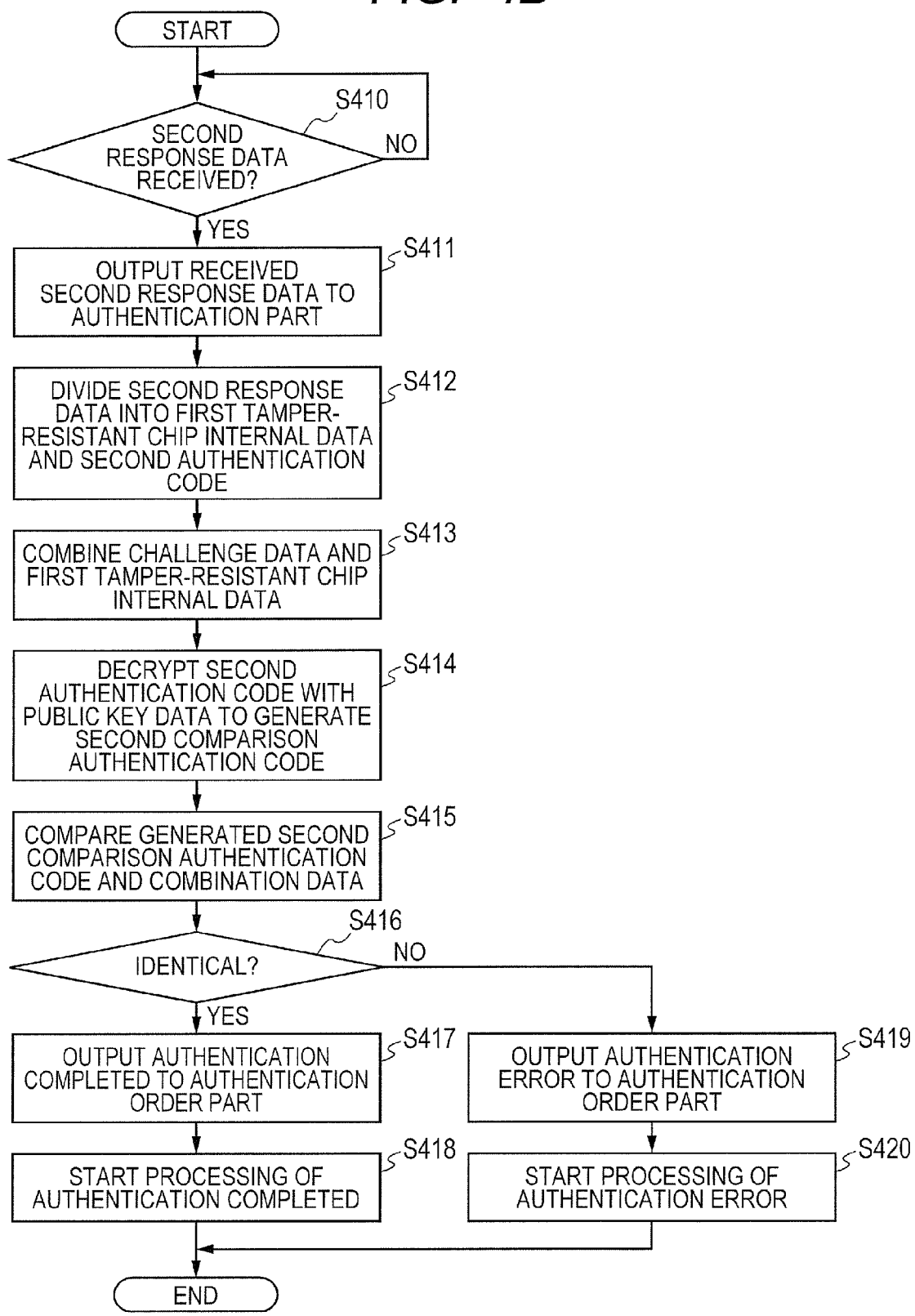

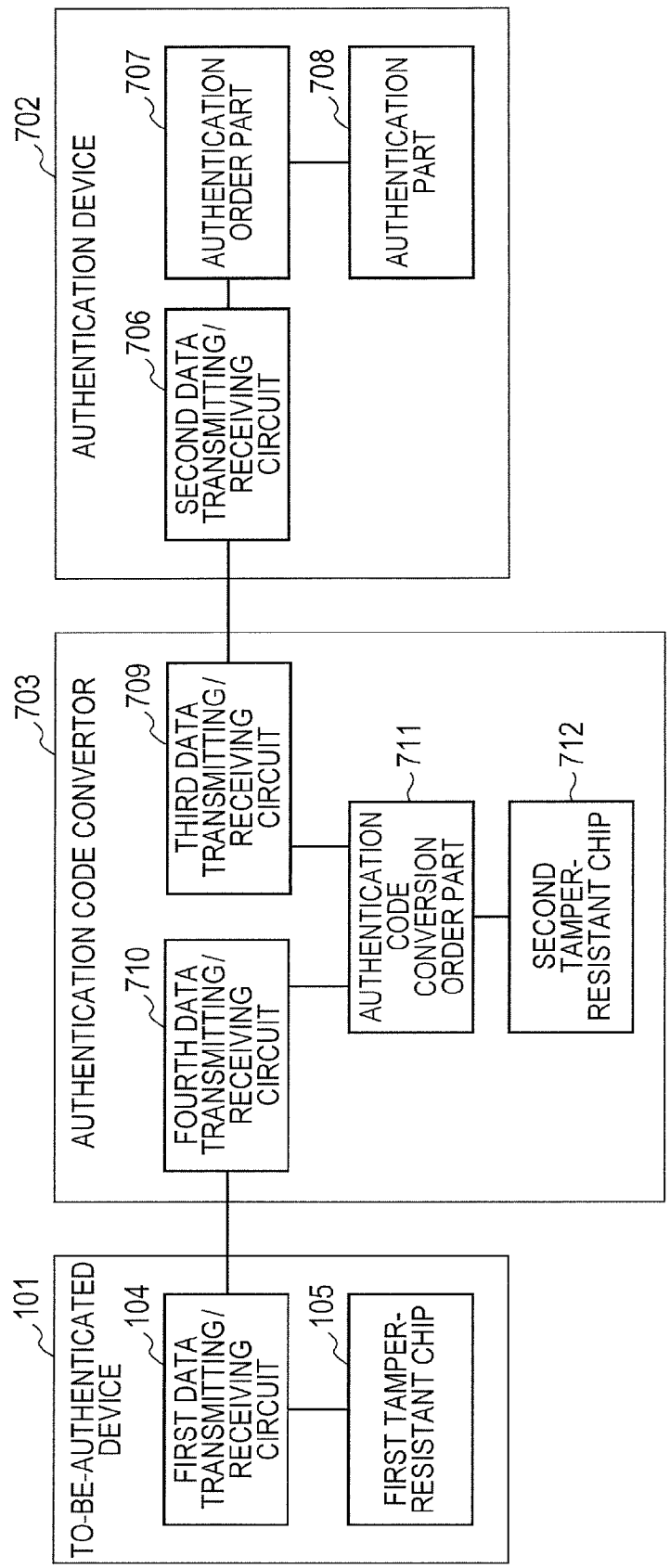

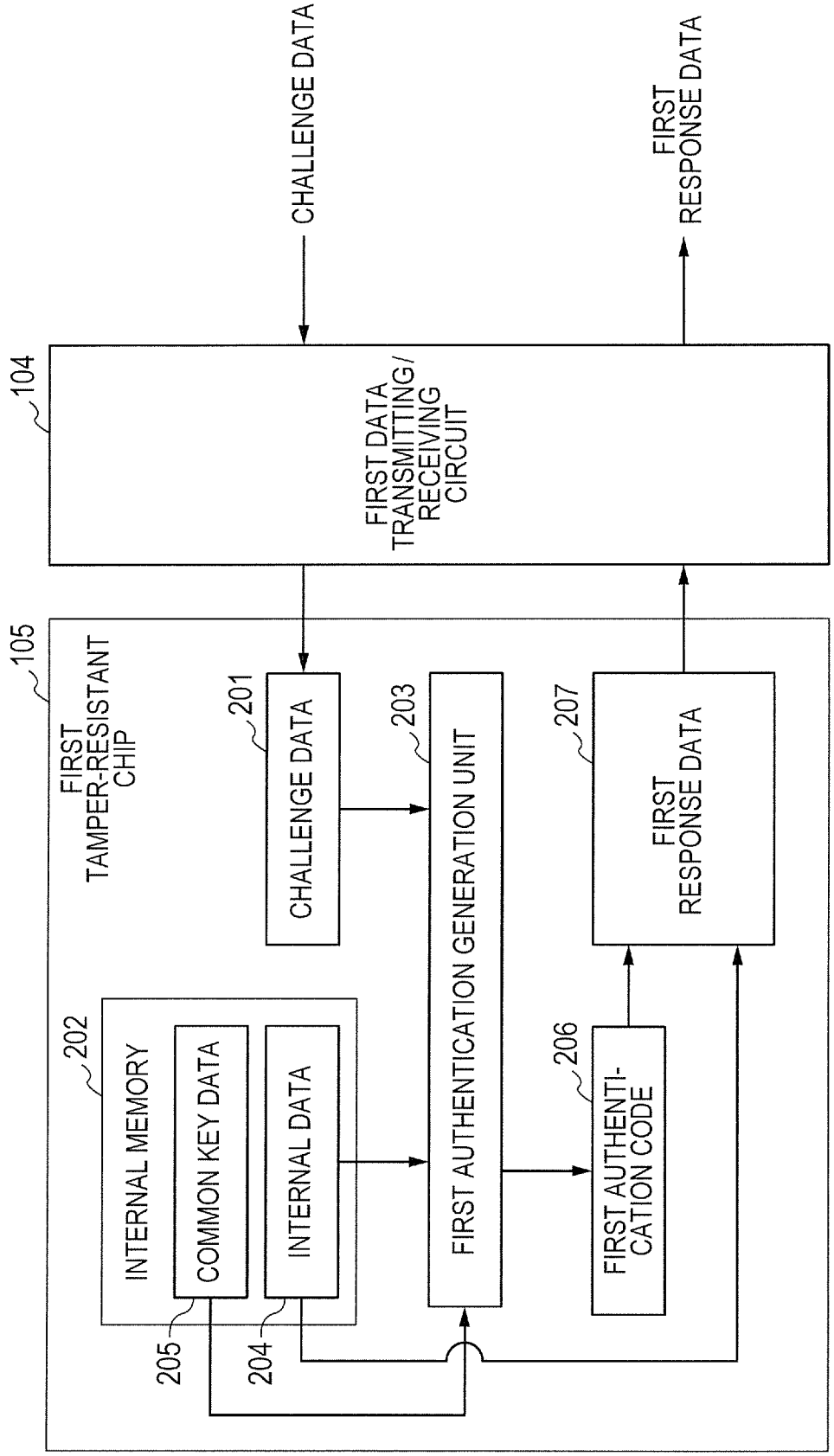

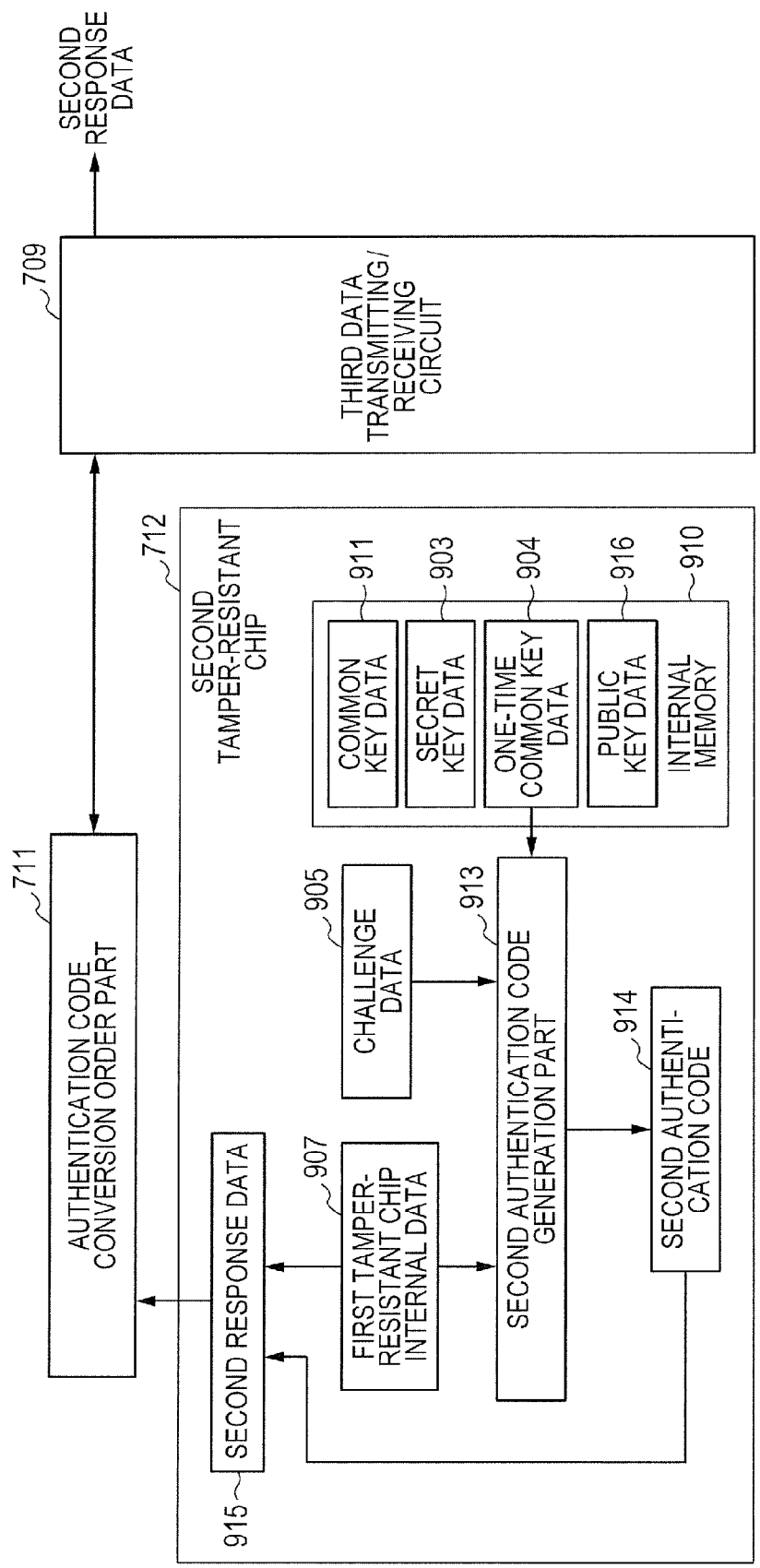

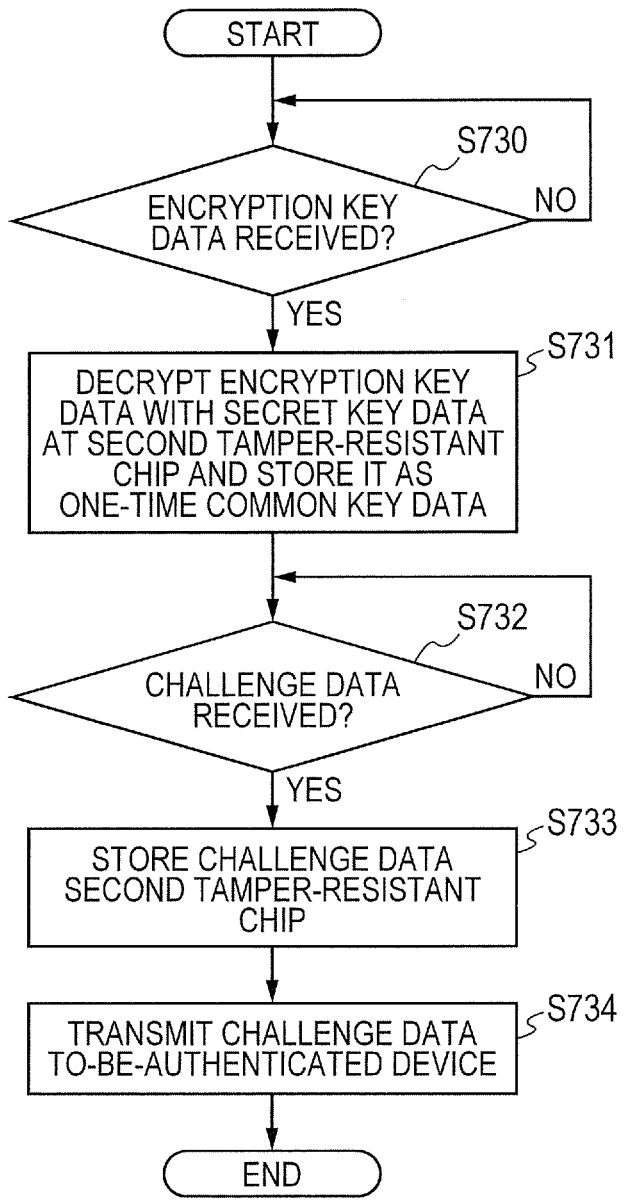

AUTHENTICATION SYSTEM AND AUTHENTICATION CODE CONVERTOR

BACKGROUND OF THE INVENTION

1. Field of the Invention

The present invention relates to an authentication system for performing authentication of a mounted device, and an authentication code convertor for converting an authentication code from a mounted device into an authentication code of an authentication device for performing authentication of the mounted device.

2. Description of the Related Art

In multi-function printers (hereinafter referred to as "printers") having a print function and a copy function, consumables and regular replacement parts are often replaced unit by unit. For example, a fixing device essential to the printer, which is used in a high-temperature environment, has a shorter life than a printer main body, and is therefore often designed so as to facilitate the replacement.

Further, many printers have expanded functions so that an optional feeder and an optional sheet delivery device can be mounted to the printer. However, when a unit other than an apparatus compatible with the printer main body (printer specifications) (for example, a unit for a printer main body of another kind) is erroneously mounted to the printer, there is a fear not only that the printer may fail to operate but also that a failure may occur in the printer main body. Therefore, particularly with regard to a unit such as a fixing device for which high reliability is demanded, it is important to determine whether or not the unit compatible with the printer main body is mounted. When it is determined that the unit incompatible with a main body is mounted, it is necessary to call a user's attention. An authentication technology, which is a kind of encryption technology, is already used to determine whether or not the mounted apparatus is the compatible unit. As examples of authentication methods to which the authentication technology is applied include a challenge-response authentication method that uses common key encryption and a digital signature that uses public key encryption.

The challenge-response authentication method is premised that a to-be-authenticated device serving as a mounted device and an authentication device serving as an authentication source each have a common key. The to-be-authenticated device encrypts data given by the authentication device (challenge data) and returns encrypted data (response data) to the authentication device, while the authentication device determines authentication based on whether or not the encrypted data returned from the to-be-authenticated device is correct. The encryption is performed here by, for example, a message authentication code technology described in "ISO/IEC 9797-1:1999, Information technology-Security techniques-Message Authentication Codes (MACs)—Part 1: Mechanisms using a block cipher." Further, by using the message authentication code technology, it is possible to simultaneously send internal data of the to-be-authenticated device and authenticate the to-be-authenticated device.

In the challenge-response authentication method, which executed based on the common key encryption, an authentication result is determined based on whether or not the authentication device and the to-be-authenticated device have the same encryption key (common key), and hence it is important that the common key in use is concealed from outside. Therefore, in order to prevent common key information from being leaked with ease, it is desired that common key data and an authentication operation be handled by a tamper-resistant chip having high security.

On the other hand, such a digital signature as described in "FIPS PUB 186-3: Federal Information Processing Standards Publication Digital Signature Standard (DSS)" is premised that the to-be-authenticated device serving as a mounted device and the authentication device serving as an authentication source have a pair of keys instead of the common key. In a digital signature technology, there exist two entities, in other words, a signer (to-be-authenticated device) for generating a digital signature and a verifier (authentication device) for verifying correctness of a signature. Then, the verifier uses a public key encryption technology to verify whether or not a message sent by the signer has been certainly generated by the signer. In the case of the digital signature technology, the authentication device and the to-be-authenticated device do not have the common key, and hence it suffices to conceal only a secret key included on a to-be-authenticated device side without the need to conceal a public key included on an authentication device side. Therefore, it suffices that only the key data and the authentication operation on the to-be-authenticated device side are handled by the tamper-resistant chip.

However, the tamper-resistant chip equipped with the public key encryption technology is more expensive than the tamper-resistant chip equipped with a common key encryption technology. Therefore, in order to reduce costs, it is desired that the tamper-resistant chip equipped with the common key encryption technology be mounted to the consumables and the regular replacement parts serving as the to-be-authenticated device.

An authentication system for ensuring that the compatible to-be-authenticated device is supplied is proposed in, for example, Japanese Patent Application Laid-Open No. 2000-76063. In the authentication system disclosed in Japanese Patent Application Laid-Open No. 2000-76063, the authentication device reads data inside the to-be-authenticated device and signature data of data obtained by encrypting a digest of the data, and compares the digest of the read data with the decrypted signature data, to thereby authenticate the to-be-authenticated device. The to-be-authenticated device combines the challenge data supplied by the authentication device, the digest stored in the to-be-authenticated device, and common secret data shared with the authentication device, again generates a digest thereof, and returns the digest as response data. The authentication device authenticates the to-be-authenticated device by determining whether or not the response data is identical with a digest of data obtained by combining the challenge data, the decrypted signature data, and the common secret data shared with the authentication device.

However, in the above-mentioned related art, in the case where the consumables and the regular replacement parts are mounted, the authentication is not performed by the printer itself but needs to be performed by an external apparatus, such as a personal computer, connected to the printer main body. Further, in a case where the common key encryption is used as the authentication technology, the tamper-resistant chip needs to be mounted to both the authentication device and the to-be-authenticated device in order to satisfy security. However, there is a problem in that it is difficult to mount the tamper-resistant chip, which is a custom part, to a general-purpose personal computer and that the personal computer cannot be used as an authentication apparatus. Further, in a case where the public key encryption is used as the authentication technology, there is no need to mount the tamper-resistant chip to the personal computer serving as the authentication apparatus. However, the tamper-resistant chip equipped with the public key encryption needs to be mounted to the to-be-authenticated device serving as the consumable, which raises a problem of an increase in the costs.

SUMMARY OF THE INVENTION

The present invention allows highly secured authentication to be performed for an apparatus to-be-authenticated while reducing costs.

In order to solve the above-mentioned problems, the present invention provides the following configurations.

(1) According to one embodiment of the present invention, there is provided an authentication system, including: a to-be-authenticated device for generating a first authentication data; an authentication code convertor for converting the first authentication data generated by the to-be-authenticated device into a second authentication data; and an authentication device for performing authentication of the to-be-authenticated device based on the second authentication data obtained by the converting by the authentication code convertor. The first authentication data includes: an authentication code obtained by encrypting challenge data output from the authentication device and input to the to-be-authenticated device through the authentication code convertor and predetermined data included in the to-be-authenticated device in accordance with an encryption method using a first encryption key; and the predetermined data included in the to-be-authenticated device. The second authentication data includes: an authentication code obtained by encrypting the challenge data output from the authentication device and input to the authentication code convertor and the predetermined data included in the to-be-authenticated device, based on an authentication result obtained when the authentication code convertor authenticates the first authentication data, in accordance with an encryption method using a second encryption key different from the encryption method using the first encryption key; and the predetermined data included in the to-be-authenticated device.

(2) According to one embodiment of the present invention, there is provided an authentication code convertor, including: a first transmitting/receiving unit for transmitting and receiving data to/from a first apparatus; a second transmitting/receiving unit for transmitting and receiving data to/from a second apparatus; a storage unit for storing information relating to key data corresponding to a predetermined encryption method; and a control unit for performing authentication of the first apparatus with the key data corresponding to the encryption method used in the first apparatus based on data received from the first apparatus by the first transmitting/receiving unit, and transmitting data obtained by encrypting the data received from the first apparatus with the key data corresponding to the encryption method used in the second apparatus through the second transmitting/receiving unit.

Further features of the present invention will become apparent from the following description of exemplary embodiments with reference to the attached drawings.

BRIEF DESCRIPTION OF THE DRAWINGS

FIGS. 4A and 4B are flowcharts illustrating operations of authentication processing performed by the authentication device according to the first embodiment.

FIG. 5B is a diagram illustrating configurations of a to-be-authenticated device, an authentication device, and an authentication code convertor according to the second embodiment.

FIGS. 6A and 6B are diagrams illustrating internal configurations of a first tamper-resistant chip and a second tamper-resistant chip, respectively, according to the second embodiment.

FIGS. 6C and 6D are diagrams illustrating internal configurations of the second tamper-resistant chip and an authentication part of the authentication device, respectively, according to the second embodiment.

FIGS. 7C and 7D are flowcharts illustrating operations of the authentication processing performed by the authentication code convertor according to the second embodiment.

DESCRIPTION OF THE EMBODIMENTS

Figure 1:
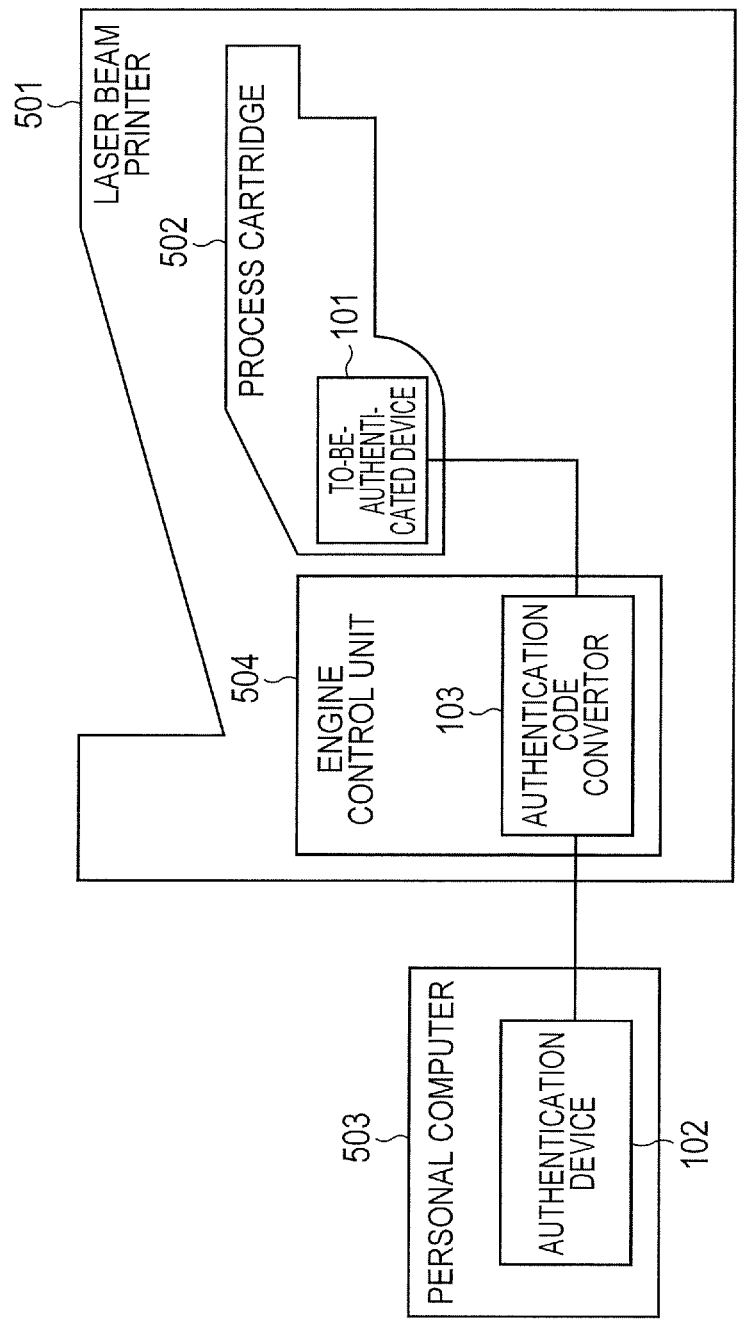
FIG. 1 is a diagram illustrating a schematic configuration of an authentication system according to a first embodiment of the present invention.

Now, an exemplary embodiment for carrying out the present invention is described in detail in connection with embodiments. The embodiments in which a common key encryption method and a public key encryption method are used are described below. To that end, encryption and an authentication method based on the common key encryption method and the public key encryption method are described.

A message authentication code technology used for the common key encryption method is a technology for detecting forgery, tamper, corruption, and the like of a message by using an encryption key (K) shared in advance between two entities of a generator and a verifier of a message authentication code (hereinafter referred to as "MAC"). This guarantees true identification of the generator of the message and completeness of the received data. In a case where the message authentication code technology is used for a challenge-response authentication method described above, a to-be-authenticated device is the generator of the MAC, while an authentication device is the verifier of the MAC. Assuming that challenge data sent from the authentication device is a message (M'), the to-be-authenticated device uses a MAC generation algorithm (F) to calculate a MAC (T)=F(K, M') from the message (M') and the encryption key (K), and sends the MAC (T) to the authentication device. The authentication device uses a MAC verification algorithm (F) to calculate a MAC (T')=F(K, M) from challenge data (M) sent to the to-be-authenticated device and the encryption key (K), and verifies whether or not the MAC (T') and the MAC (T) are identical with each other. The authentication device determines the authentication completed when the MAC (T') and the MAC (T) are identical with each other, and otherwise, determines the authentication failed.

Further, by using the message authentication code technology, it is possible to simultaneously send internal data of the to-be-authenticated device and authenticate the to-be-authenticated device. The to-be-authenticated device combines challenge data (C') sent from the authentication device and internal data (D) of the to-be-authenticated device, to generate a message (M)=C'||D. Then, the to-be-authenticated device uses the MAC generation algorithm (F) to calculate the MAC (T)=F(K, M) from the message (M) and the encryption key (K), and sends a pair (D, MAC (T)) of the internal data (D) of the to-be-authenticated device and the MAC (T) to the authentication device. The authentication device uses the MAC verification algorithm (F) to calculate the MAC (T')=F (K, C||D') from challenge data (C) sent to the to-be-authenticated device, internal data (D') received from the to-be-authenticated device, and the encryption key (K). Then, the authentication device verifies whether or not the calculated MAC (T') and the MAC (T) received from the to-be-authenticated device are identical with each other. When the MAC (T') and the MAC (T) are identical with each other, this means that the authentication completed and the internal data of the to-be-authenticated device are sent correctly, and otherwise, this means that the authentication failed or there is corruption in the sent internal data of the to-be-authenticated device.

On the other hand, a digital signature, in which the public key encryption method is used, is premised that the to-be-authenticated device serving as a mounted device and the authentication device serving as an authentication source have a pair of keys instead of the common key. In a digital signature technology, there exist two entities, in other words, a signer (to-be-authenticated device) for generating a digital signature and a verifier (authentication device) for verifying correctness of a signature. Then, the verifier uses a public key encryption technology to verify whether or not a message sent by the signer has been certainly generated by the signer. Note that, a third party (authentication authority) for guaranteeing the correctness of a public key of the signer is used as necessary. The to-be-authenticated device secretly retains a signature generation cryptographic key (sk) including a secret key, generates a signature (S) for a signature target document (M) sent from the authentication device, and returns the signature target document (M) to the authentication device. At this time, the signature generation key (sk) and a signature verification key (public key) (pk) corresponding thereto may be generated by the to-be-authenticated device in advance, or may be generated by a key generation apparatus other than the to-be-authenticated device.

The authentication device acquires the signature (S) and the signature verification key (pk) from the to-be-authenticated device. In the case of using the authentication authority, the signature verification key (pk) is acquired along with a public key authentication issued by the authentication authority. The authentication device uses the signature target document (M) sent to the to-be-authenticated device, the signature (S) received from the to-be-authenticated device, and the signature verification key (pk) to authenticate whether or not the signature (S) is correct against the signature target document (M) and the signature verification key (pk). The authentication device determines the authentication completed when the signature (S) is correct, and otherwise, determines the authentication failed.

First Embodiment

Configuration of Authentication System of Image Forming Apparatus

FIG. 1 is a diagram illustrating a schematic configuration of an authentication system according to a first embodiment of the present invention. The authentication system includes an image forming apparatus for forming an image on a sheet and a personal computer connected to the image forming apparatus. As an example of the image forming apparatus, FIG. 1 illustrates a case of a laser beam printer. In FIG. 1, a personal computer 503 (hereinafter referred to as "PC 503") serving as a second apparatus transmits a drawing order to a laser beam printer main body 501 (hereinafter referred to as "main body 501"). The main body 501 includes a process cartridge 502 serving as a first apparatus detachably mountable to the main body 501 and an engine control unit 504, and the engine control unit 504 controls the main body 501 in accordance with the drawing order received from the PC 503. This embodiment describes a system in which the PC 503 authenticates whether or not the process cartridge 502 serving as a replaceable apparatus mounted to the main body 501 is compatible with the image forming apparatus.

In FIG. 1, the process cartridge 502 is equipped with a to-be-authenticated device 101 for generating a first authentication code serving as encrypted data for authenticating the cartridge. When the process cartridge 502 is mounted to the main body 501, the process cartridge 502 transmits the first authentication code to the engine control unit 504. The engine control unit 504 is equipped with an authentication code convertor 103, which converts the first authentication code received from the process cartridge 502 into a second authentication code that can be authenticated by the PC 503, and transmits the second authentication code to the PC 503. The PC 503 is equipped with an authentication device 102 for authenticating the process cartridge 502, which authenticates whether or not the process cartridge 502 is compatible based on the second authentication code received from the engine control unit 504. In this embodiment, the authentication device 102 is not limited to hardware, and may be, for example, software for executing the same functions.

(Configurations of to-be-Authenticated Device, Authentication Device, and Authentication Code Convertor)

Figure 2:
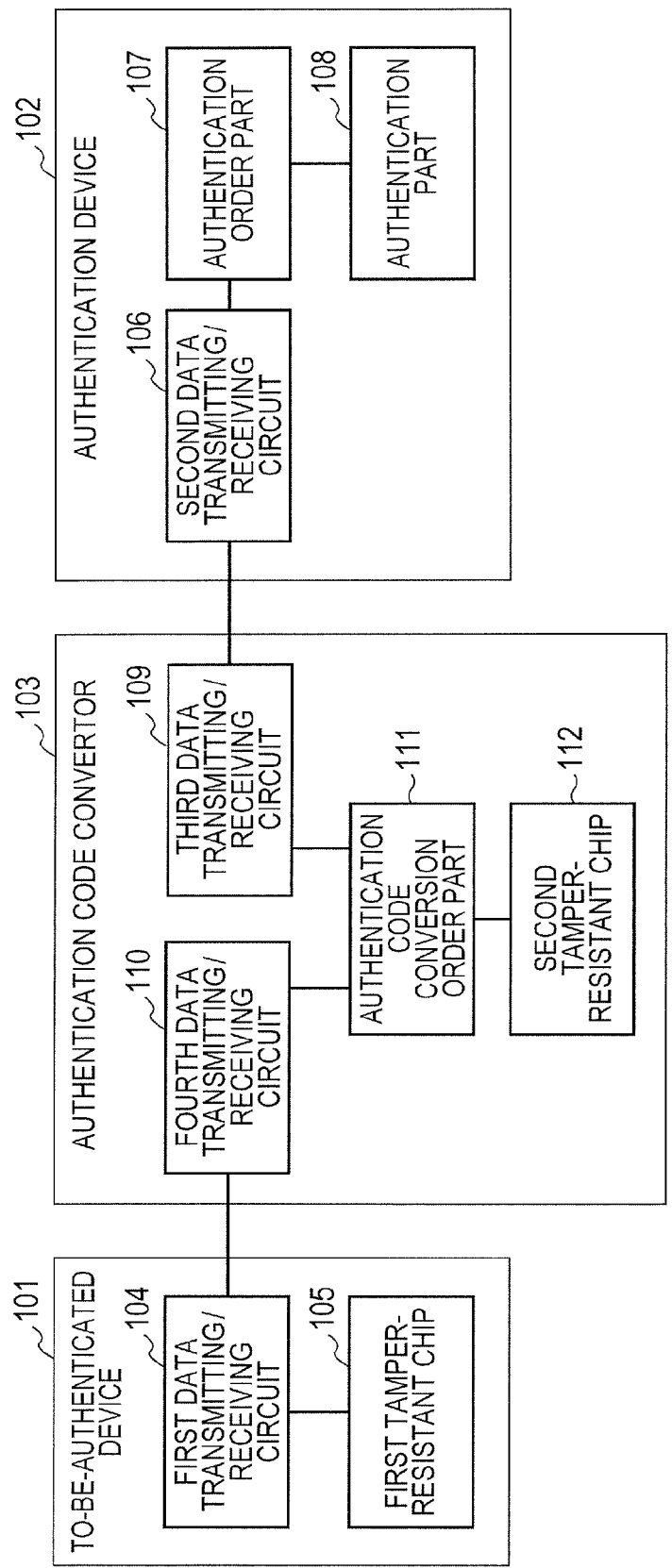
FIG. 2 is a diagram illustrating configurations of a to-be-authenticated device, an authentication device, and an authentication code convertor according to the first embodiment.

FIG. 2 is a diagram illustrating configurations of the to-be-authenticated device 101 of the process cartridge 502, the authentication device 102 of the PC 503, and the authentication code convertor 103 of the engine control unit 504.

The to-be-authenticated device 101 includes a first data transmitting/receiving circuit 104 and a first tamper-resistant chip 105. The first data transmitting/receiving circuit 104 transmits/receives data to/from the authentication code convertor 103 of the engine control unit 504, and the first tamper-resistant chip 105 generates response data from the challenge data received by the first data transmitting/receiving circuit 104. The first tamper-resistant chip 105 encrypts the challenge data based on the common key encryption method, and generates a first response data serving as a first authentication data.

The authentication device 102 includes a second data transmitting/receiving circuit 106 for transmitting/receiving data to/from the authentication code convertor 103 of the engine control unit 504, an authentication order part 107 for issuing an order to start authentication, and an authentication part 108 for performing an authentication operation in accordance with the order issued from the authentication order part 107.

An external data transmitter/receiver unit of the authentication code convertor 103 is formed of a third data transmitting/receiving circuit 109 serving as a second transmitting/receiving unit and a fourth data transmitting/receiving circuit 110 serving as a first transmitting/receiving unit. The third data transmitting/receiving circuit 109 transmits/receives data to/from the authentication device 102 of the PC 503, and the fourth data transmitting/receiving circuit 110 transmits/receives data to/from the to-be-authenticated device 101 of the process cartridge 502. In addition, the authentication code convertor 103 includes an authentication code conversion order part 111 and a second tamper-resistant chip 112. When the fourth data transmitting/receiving circuit 110 receives the first response data from the to-be-authenticated device 101, the authentication code conversion order part 111 issues an authentication code conversion order. The second tamper-resistant chip 112 decrypts the first response data based on the common key encryption method in accordance with the order issued from the authentication code conversion order part 111. Then, the second tamper-resistant chip 112 encrypts the decrypted a first response data based on the public key encryption method, and generates a second response data serving as a second authentication data.

(Internal Configurations of First and Second Tamper-Resistant Chips and Authentication Part)

FIGS. 3A to 3D are diagrams illustrating relationships among memories serving as storage units, data, and processing blocks (for example, authentication determination part), which form the first tamper-resistant chip 105 of the to-be-authenticated device 101, the second tamper-resistant chip 112 of the authentication code convertor 103, and the authentication part 108 of the authentication device 102. Here, common key data 205 within an internal memory 202 of the first tamper-resistant chip 105 illustrated in FIG. 3A and common key data 407 within an internal memory 406 of the second tamper-resistant chip 112 illustrated in FIG. 3B, which are described later, have the same data value. The sharing of common key data used for the encryption/decryption is performed by, for example, setting the key data that is common, or writing additional information for using the key data that is common, at a time of initializing the first tamper-resistant chip 105 and the second tamper-resistant chip 112.

Further, public key data 413 within the internal memory 406 of the second tamper-resistant chip 112 illustrated in FIG. 3C and public key data 308 within the authentication part 108 illustrated in FIG. 3D, which are described later, have the same data value. The sharing of the public key used for the decryption is performed by, for example, the authentication part 108 reading and acquiring the public key data 413, which forms a pair with secret key data 408 retained in the internal memory 406 of the second tamper-resistant chip 112, before the authentication operation is executed at the authentication part 108.

(Internal Configuration of First Tamper-Resistant Chip)

Figure 3A:
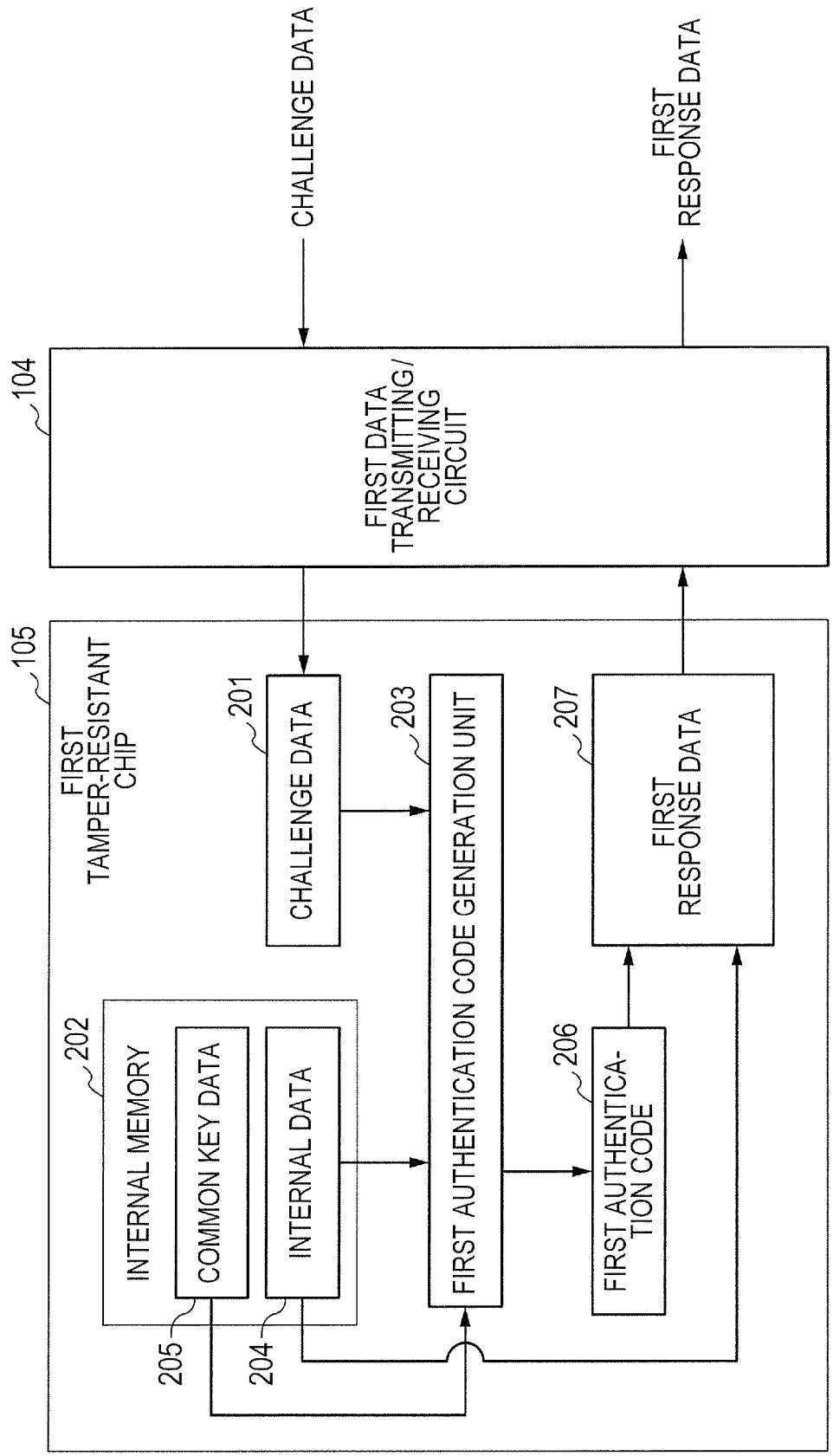
FIGS. 3A and 3B are diagrams illustrating internal configurations of a first tamper-resistant chip and a second tamper-resistant chip, respectively, according to the first embodiment.

FIG. 3A is a diagram illustrating the relationship among (internal configurations of) the memory, the data, and the processing block (first authentication code generation part) within the first tamper-resistant chip 105 of the to-be-authenticated device 101. In FIG. 3A, when the challenge data transmitted from the authentication device 102 is received, the first data transmitting/receiving circuit 104 outputs the challenge data to the first tamper-resistant chip 105. In the first tamper-resistant chip 105, input challenge data 201 is input to a first authentication code generation part 203 along with internal data 204 within the internal memory 202 serving as predetermined data of the first tamper-resistant chip 105. In the first authentication code generation part 203, processing for combining the two input pieces of data is performed, and the combined pieces of data are subjected to encryption processing with the common key data 205 stored within the internal memory 202 serving as a first encryption key. Any encryption processing can be executed here as long as an authentication code of the input data obtained by combining the challenge data 201 and the internal data 204 is generated by using the common key encryption as in the case of the above-mentioned message authentication code (MAC). A first authentication code 206 subjected to the encryption processing and output from the first authentication code generation part 203 forms a first response data 207 together with the internal data 204 within the internal memory 202, and is output to the first data transmitting/receiving circuit 104.

(Internal Configuration of Second Tamper-Resistant Chip)

Figure 3B:
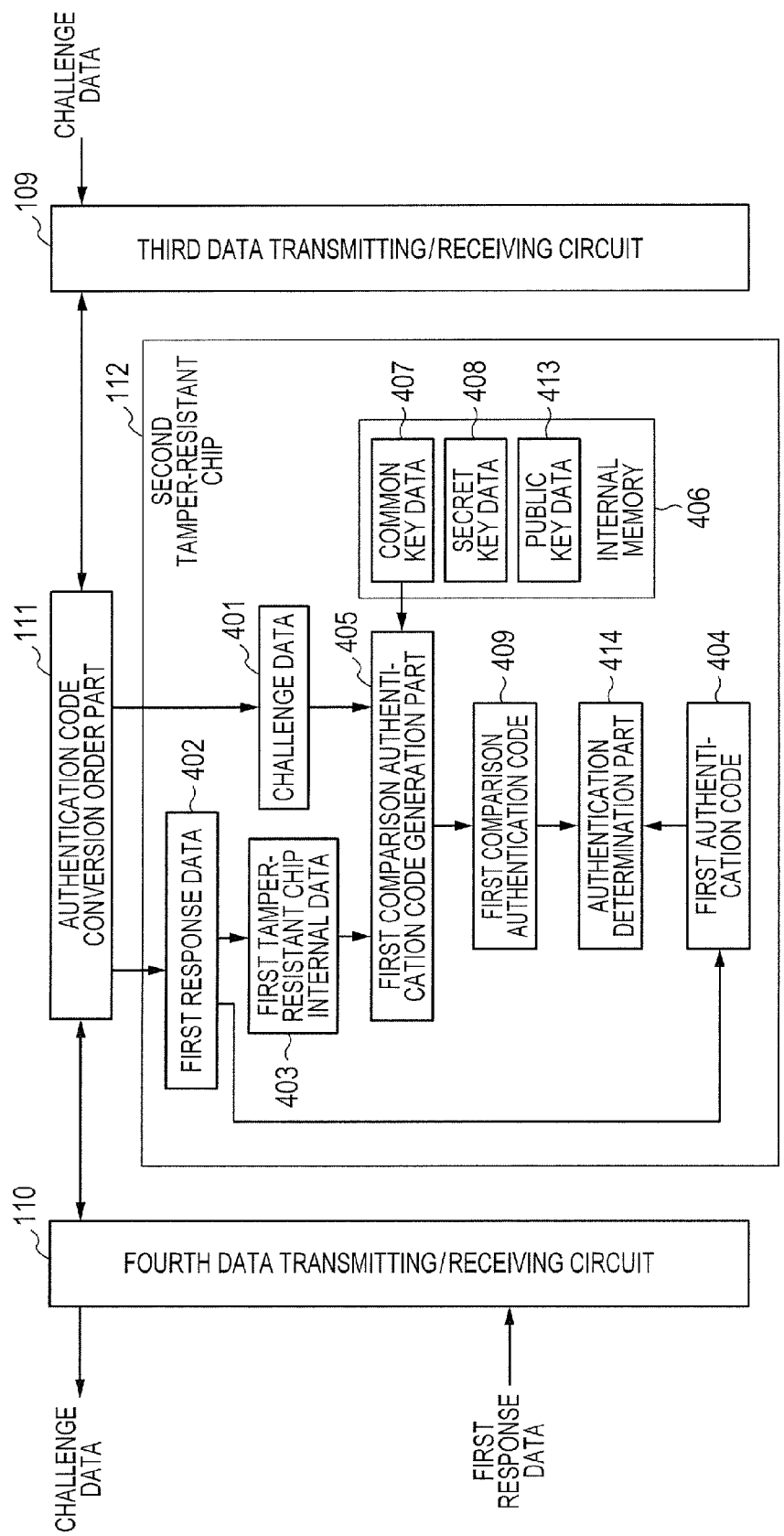

Next, the internal configuration of the second tamper-resistant chip 112 is described. FIG. 3B is a diagram illustrating the relationship among (internal configurations of) the memory, the data, and the processing blocks exhibited when the challenge data received from the authentication device 102 is transmitted to the to-be-authenticated device 101 and when the authentication operation for the first authentication code is performed. FIG. 3C is a diagram illustrating the relationship among the memory, the data, and the processing block exhibited when the first authentication code is converted into the second authentication code. Note that, the same memory and the same data between FIG. 3B and FIG. 3C are denoted by the same reference numerals.

In FIG. 3B, when the challenge data is received from the authentication device 102 through the third data transmitting/receiving circuit 109, the authentication code conversion order part 111 outputs the challenge data to the second tamper-resistant chip 112. Then, the authentication code conversion order part 111 transmits challenge data 401 to the to-be-authenticated device 101 through the fourth data transmitting/receiving circuit 110. Then, the authentication code conversion order part 111 monitors an input of the first response data made in response to the challenge data from the to-be-authenticated device 101 through the fourth data transmitting/receiving circuit 110. When the first response data is input, the authentication code conversion order part 111 outputs an input first response data 402 to the second tamper-resistant chip 112 while issuing the authentication code conversion order thereto. The second tamper-resistant chip 112, which has received the authentication code conversion order, divides the input first response data 402 into a first tamper-resistant chip internal data 403 and a first authentication code 404. The first tamper-resistant chip internal data 403 obtained by the dividing is input to a first comparison authentication code generation part 405 along with the challenge data 401 received from the authentication device 102. The first comparison authentication code generation part 405 performs the processing for combining the two input pieces of data. The combined data is subjected to the encryption processing with the common key data 407 stored in the internal memory 406 of the second tamper-resistant chip 112, thereby generating a first comparison authentication code 409. Here, the first comparison authentication code generation part 405 performs the same processing as the first authentication code generation part 203 illustrated in FIG. 3A. The first comparison authentication code 409 generated by the encryption processing is compared with the first authentication code 404 obtained by dividing the first response data 402 at an authentication determination part 414. When the two pieces of data are identical with each other, the second tamper-resistant chip 112 advances to processing for generating the second response data illustrated in FIG. 3C. When the two pieces of data are not identical, the second tamper-resistant chip 112 outputs an authentication error to the authentication code conversion order part 111.

Figure 3C:
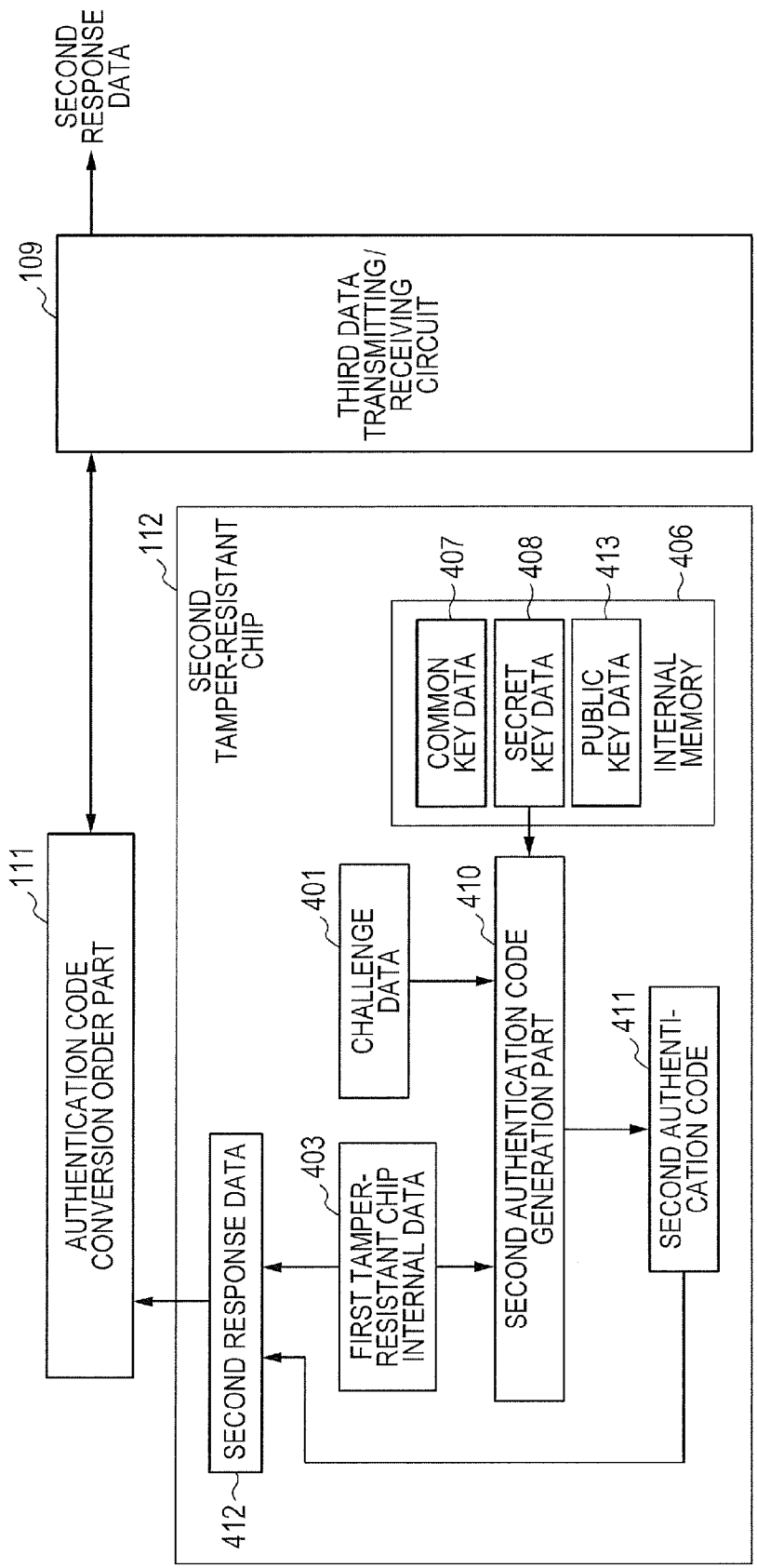
FIGS. 3C and 3D are diagrams illustrating internal configurations of the second tamper-resistant chip and an authentication part of the authentication device, respectively, according to the first embodiment.

When the first comparison authentication code 409 and the first authentication code 404 are identical with each other, in FIG. 3C, the second tamper-resistant chip 112 inputs the challenge data 401 and the first tamper-resistant chip internal data 403 to a second authentication code generation part 410. The second authentication code generation part 410 performs the processing for combining the two pieces of data. The combined data is subjected to the encryption processing with the secret key data 408 stored within the internal memory 406 serving as a second encryption key. Any encryption processing can be executed here as long as the authentication code (signature data) of the input data is generated by public key encryption as in the case of digital signature. A second authentication code 411 generated by the encryption processing forms a second response data 412 together with the first tamper-resistant chip internal data 403 obtained by dividing the first response data 402. Then, the second tamper-resistant chip 112 outputs the second response data 412 to the authentication code conversion order part 111. The authentication code conversion order part 111 transmits the input second response data 412 to the authentication device 102 through the third data transmitting/receiving circuit 109.

(Internal Configuration of Authentication Part)

Figure 3D:
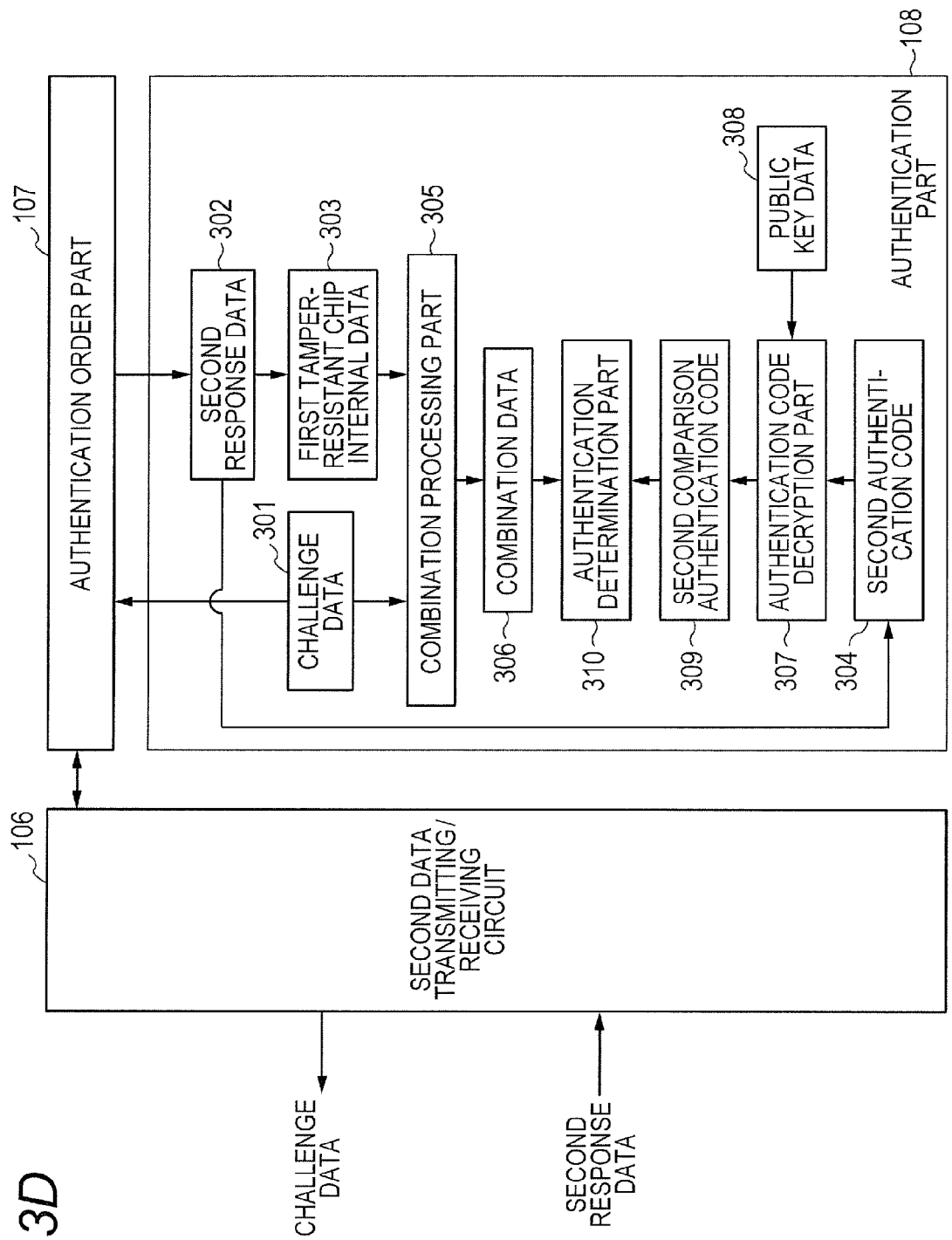

FIG. 3D is a diagram illustrating the relationship among the memory, the data, and the processing blocks (such as authentication determination part) within the authentication part 108 of the authentication device 102. In FIG. 3D, when the order to start the authentication is issued from the authentication order part 107, the authentication part 108 generates challenge data 301 and outputs the challenge data 301 to the authentication order part 107. The authentication order part 107 outputs the input challenge data 301 to the second data transmitting/receiving circuit 106, and monitors an input of the second response data 302 made in response to the challenge data 301 from the authentication code convertor 103 through the second data transmitting/receiving circuit 106. When the second response data 302 is input, the authentication order part 107 outputs the input second response data 302 to the authentication part 108, and issues an authentication order thereto. The authentication part 108, which has received the authentication order, divides the input second response data 302 into a first tamper-resistant chip internal data 303 and a second authentication code 304. The first tamper-resistant chip internal data 303 obtained by the dividing is input to a combination processing part 305 along with the challenge data 301. The combination processing part 305 performs the processing for combining the two input pieces of data, and outputs combination data 306. On the other hand, the second authentication code 304 obtained by dividing the second response data 302 is input to an authentication code decryption part 307. At the authentication code decryption part 307, the second authentication code 304 is subjected to decryption processing with the public key data 308, thereby outputting a second comparison authentication code 309.

The second comparison authentication code 309 output as a result of the decryption processing performed at the authentication code decryption part 307 is compared with the combination data 306 at an authentication determination part 310. Then, the authentication part 108 outputs the authentication completed to the authentication order part 107 when the two pieces of data are identical with each other, and otherwise, outputs the authentication error thereto.

(Flow of Processing from Authentication Start to Authentication Determination)

Figure 4C:
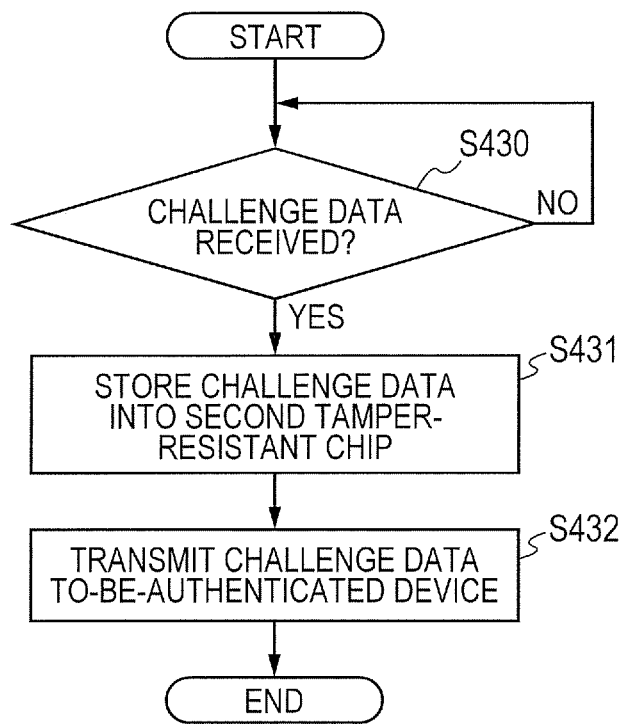
FIGS. 4C and 4D are flowcharts illustrating operations of the authentication processing performed by the authentication code convertor according to the first embodiment.
Figure 4D:
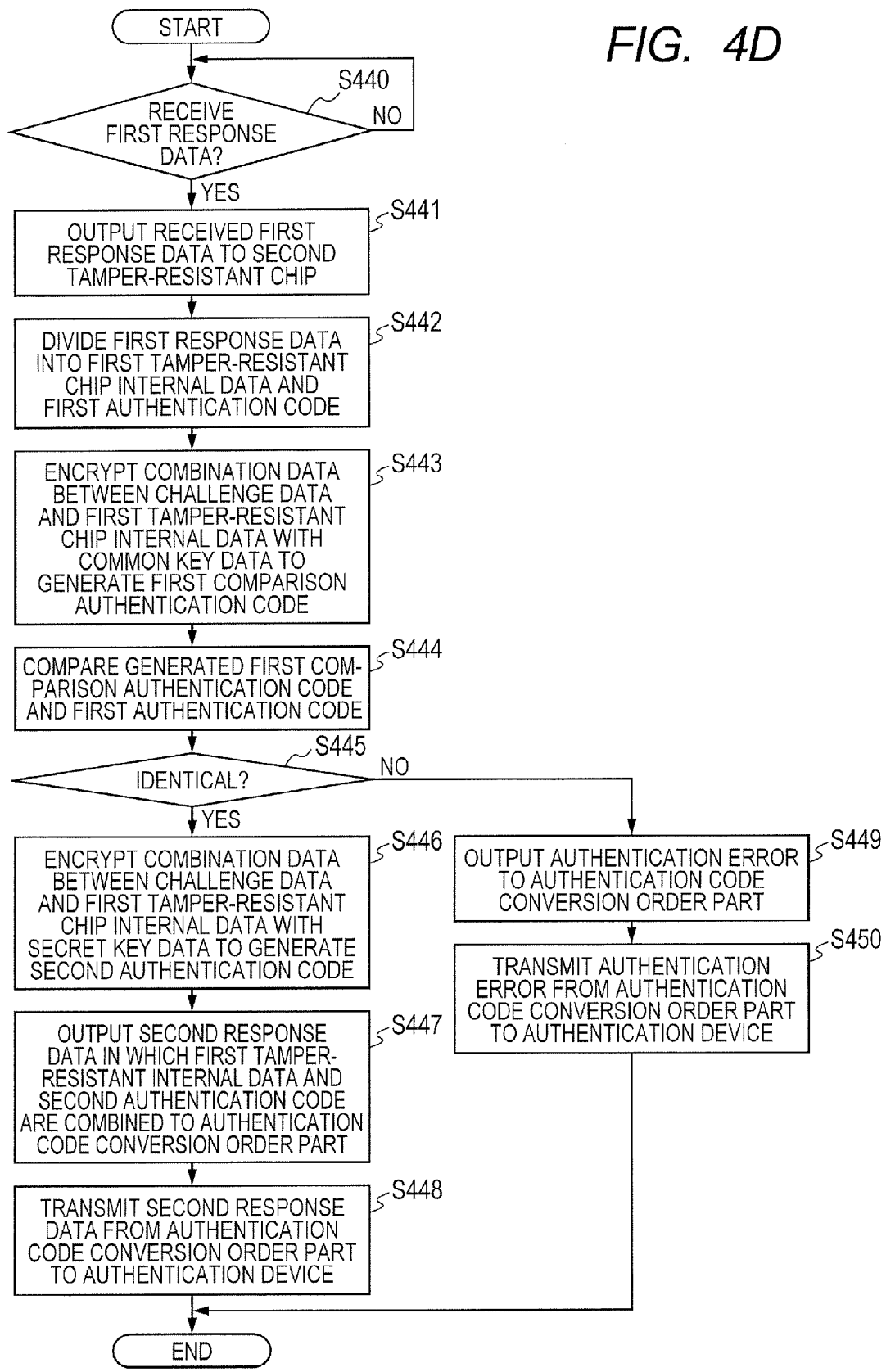
Figure 4E:
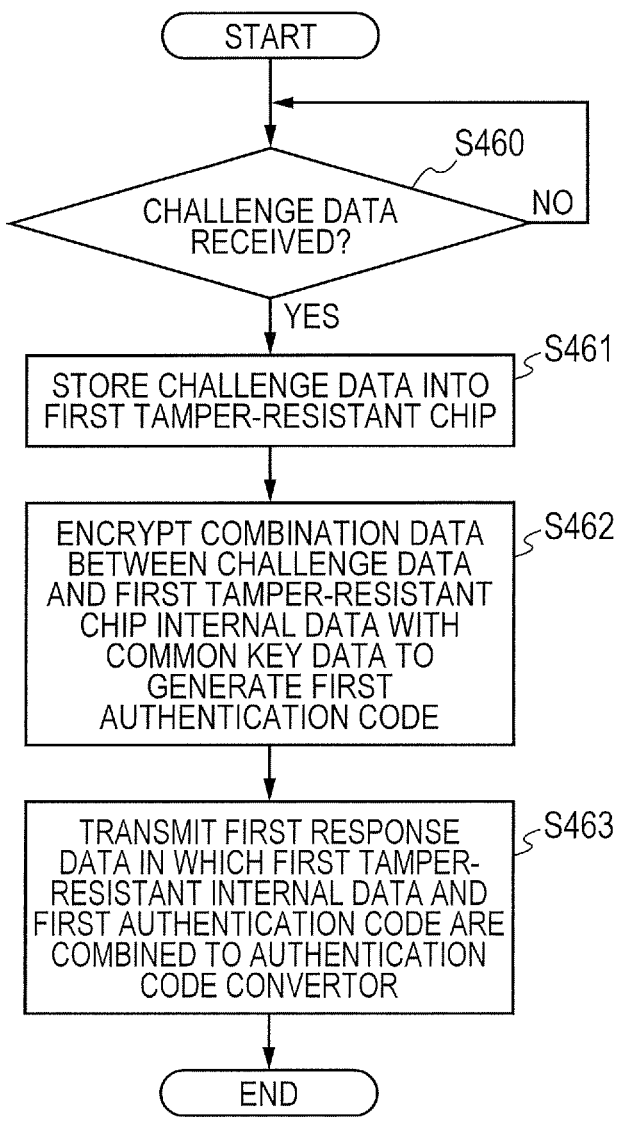
FIG. 4E is a flowchart illustrating an operation of the authentication processing performed by the to-be-authenticated device according to the first embodiment.

Next, a flow of processing from an authentication start to the authentication determination is described with reference to flowcharts of FIGS. 4A to 4E. FIGS. 4A and 4B are flowcharts illustrating operations of authentication processing performed by the authentication device 102. FIG. 4A illustrates the operation from the authentication start to transmission of the challenge data, and FIG. 4B illustrates the operation for performing the authentication determination after receiving the second response data. FIGS. 4C and 4D are flowcharts illustrating operations of the authentication processing performed by the authentication code convertor 103. FIG. 4C illustrates the operation from reception of the challenge data to the transmission of the challenge data, and FIG. 4D illustrates the operation from the reception of the first response data to the transmission of the second response data. FIG. 4E is a flowchart illustrating an operation of the authentication processing performed by the to-be-authenticated device 101, and illustrates the operation from the reception of the challenge data to the transmission of the first response data. With reference to the above-mentioned flowcharts, operations of the respective parts are described below from the authentication start to an end of the authentication determination in the authentication system according to this embodiment.

(Processing Performed by Authentication Device (Part 1))

In FIG. 4A, when detecting that the process cartridge 502 has been inserted into the main body 501, the engine control unit 504 transmits a cartridge detection signal to the PC 503. In Step 401 (hereinafter referred to as "S401"; the other step numbers also abbreviated likewise), the PC 503 determines whether or not the engine control unit 504 has detected insertion of the cartridge based on whether or not the cartridge detection signal has been received. When the second data transmitting/receiving circuit 106 receives the cartridge detection signal, the procedure advances to the processing of S402, and when the cartridge detection signal has not been received yet, the processing of S401 is repeated. In S402, when notified by the second data transmitting/receiving circuit 106 that the cartridge detection signal has been received, the authentication order part 107 designates the authentication start to the authentication part 108. In S403, the authentication part 108, which has received an order to start the authentication, generates the challenge data 301 including a random number component, and outputs the challenge data 301 to the authentication order part 107. In S404, the authentication order part 107 transmits the challenge data 301 to the authentication code convertor 103 of the engine control unit 504 through the second data transmitting/receiving circuit 106.

(Processing Performed by Authentication Code Convertor (Part 1))

In FIG. 4C, in S430, the third data transmitting/receiving circuit 109 of the authentication code convertor 103 of the engine control unit 504 determines whether or not the challenge data has been received from the authentication device 102 of the PC 503. When the third data transmitting/receiving circuit 109 receives the challenge data, the procedure advances to the processing of S431, and when the challenge data has not been received yet, the processing of S430 is repeated. In S431, the authentication code conversion order part 111, which has received the challenge data through the third data transmitting/receiving circuit 109, outputs the received challenge data to the second tamper-resistant chip 112. The second tamper-resistant chip 112, which has the received challenge data input from the authentication code conversion order part 111, stores the received challenge data as the challenge data 401. Here, the challenge data 301 generated by the authentication part 108 of the authentication device 102 of the PC 503 and the challenge data 401 indicate the same data. In S432, the authentication code conversion order part 111 transmits the challenge data to the to-be-authenticated device 101 of the process cartridge 502 through the fourth data transmitting/receiving circuit 110.

(Processing Performed by to-be-Authenticated Device)

In FIG. 4E, in S460, the first data transmitting/receiving circuit 104 determines whether or not the challenge data has been received from the authentication code convertor 103 of the engine control unit 504. When the first data transmitting/receiving circuit 104 receives the challenge data, the procedure advances to the processing of S461, and when the challenge data has not been received yet, the processing of S460 is repeated. In S461, the first tamper-resistant chip 105, which has received the challenge data through the first data transmitting/receiving circuit 104, stores the received challenge data as the challenge data 201. In S462, the first tamper-resistant chip 105 inputs the received challenge data and the internal data 204 stored in the internal memory 202 to the first authentication code generation part 203. At the first authentication code generation part 203, the processing for combining the challenge data 201 and the internal data 204 that have been input is performed. The obtained combination data is subjected to the encryption with the common key data 205 within the internal memory 202, thereby generating the first authentication code 206. In S463, the first tamper-resistant chip 105 combines the first authentication code 206 and the internal data 204 stored in the internal memory 202, to generate the first response data 207. Then, the first tamper-resistant chip 105 transmits the first response data 207 to the authentication code convertor 103 of the engine control unit 504 through the first data transmitting/receiving circuit 104.

(Processing Performed by Authentication Code Convertor (Part 2)

In FIG. 4D, in S440, the fourth data transmitting/receiving circuit 110 of the authentication code convertor 103 of the engine control unit 504 determines whether or not the first response data has been received from the to-be-authenticated device 101 of the process cartridge 502. When the fourth data transmitting/receiving circuit 110 receives the first response data, the procedure advances to the processing of S441, and when the first response data has not been received yet, the processing of S440 is repeated. In S441, the authentication code conversion order part 111, which has received the first response data through the fourth data transmitting/receiving circuit 110, outputs the first response data to the second tamper-resistant chip 112 while issuing the authentication code conversion order. In S442, the second tamper-resistant chip 112, which has the first response data input thereto, stores the input first response data as the first response data 402. Here, the first response data 207 within the first tamper-resistant chip 105 of the to-be-authenticated device 101 of the process cartridge 502 and the first response data 402 stored in the second tamper-resistant chip 112 indicate the same data. The input first response data 402 is divided into the first tamper-resistant chip internal data 403 and the first authentication code 404 by the second tamper-resistant chip 112.

In S443, the first tamper-resistant chip internal data 403 is input to the first comparison authentication code generation part 405 along with the challenge data 401. At the first comparison authentication code generation part 405, the processing for combining the challenge data 401 and the first tamper-resistant chip internal data 403 that have been input is performed. In addition, at the first comparison authentication code generation part 405, the obtained combination data is subjected to the encryption processing with the common key data 407 stored in the internal memory 406 of the second tamper-resistant chip 112, thereby generating the first comparison authentication code 409.

In S444, at the authentication determination part 414, the generated first comparison authentication code 409 and the first authentication code 404 are compared with each other. In S445, the authentication determination part 414 determines whether or not the first comparison authentication code 409 and the first authentication code 404 are identical with each other. The authentication determination part 414 advances to S446 when the two pieces of data are identical with each other, and otherwise, advances to S449. In S449, the authentication determination part 414 outputs the authentication error to the authentication code conversion order part 111. In S450, the authentication code conversion order part 111, which has received the authentication error from the authentication determination part 414, notifies the authentication device 102 of the PC 503 of information on the authentication error through the third data transmitting/receiving circuit 109. Note that, the authentication device 102 of the PC 503, which has received the authentication error, executes processing of the authentication error (S420) described later, and brings the authentication processing to an end.

In S446, the first comparison authentication code 409 and the first authentication code 404 are identical with each other, and hence the second tamper-resistant chip 112 inputs the first tamper-resistant chip internal data 403 and the challenge data 401 to the second authentication code generation part 410. At the second authentication code generation part 410, the processing for combining the challenge data 401 and the first tamper-resistant chip internal data 403 that have been input is performed. At the second authentication code generation part 410, the obtained combination data is subjected to the encryption processing with the secret key data 408 stored in the internal memory 406, thereby generating the second authentication code 411. In S447, the second tamper-resistant chip 112 combines the generated second authentication code 411 and the first tamper-resistant chip internal data 403 to generate the second response data 412, and outputs the second response data 412 to the authentication code conversion order part 111. In S448, the authentication code conversion order part 111 transmits the second response data 412 input from the second tamper-resistant chip 112 to the authentication device 102 of the PC 503 through the third data transmitting/receiving circuit 109.

(Processing Performed by Authentication Device (Part 2))

In FIG. 4B, in S410, the second data transmitting/receiving circuit 106 of the authentication device 102 of the PC 503 determines whether or not the second response data has been received from the authentication code convertor 103 of the engine control unit 504. When the second data transmitting/receiving circuit 106 receives the second response data, the procedure advances to the processing of S411, and when the second response data has not been received yet, the processing of S410 is repeated. In S411, the authentication order part 107, which has received the second response data through the second data transmitting/receiving circuit 106, outputs the second response data 412 to the authentication part 108 while issuing a last authentication processing order. In S412, the authentication part 108 stores the second response data output from the authentication order part 107 as the second response data 302. Here, the second response data 412 within the second tamper-resistant chip 112 of the authentication code convertor 103 of the engine control unit 504 and the second response data 302 stored in the authentication part 108 indicate the same data. Further, the authentication part 108 divides the input second response data 302 into the first tamper-resistant chip internal data 303 and the second authentication code 304.

In S413, the first tamper-resistant chip internal data 303 is input to the combination processing part 305 along with the challenge data 301. At the combination processing part 305, the processing for combining the challenge data 301 and the first tamper-resistant chip internal data 303 that have been input is performed to generate and output the combination data 306. In S414, the second authentication code 304 divided from the input second response data 302 is input to the authentication code decryption part 307. At the authentication code decryption part 307, the input second authentication code 304 is subjected to the decryption processing with the public key data 308, thereby generating the second comparison authentication code 309.

In S415, the generated second comparison authentication code 309 and the combination data 306 are input to the authentication determination part 310, and the authentication determination part 310 compares the second comparison authentication code 309 and the combination data 306. In S416, the authentication determination part 310 determines whether or not the second comparison authentication code 309 and the combination data 306 are identical with each other. The authentication determination part 310 advances to S417 when the two pieces of data are identical with each other, and otherwise, advances to S419. In S419, the authentication determination part 310 outputs the authentication error to the authentication order part 107. In S420, the authentication order part 107, which has received the authentication error, executes the processing of the authentication error, for example, displays the authentication error on a display part of the PC 503 or emits warning sound, and brings the authentication processing to an end. In S417, the authentication determination part 310 outputs the authentication completed to the authentication order part 107. In S418, the authentication order part 107, which has received the authentication completed, executes processing of the authentication completed, for example, displays the authentication completed on the display part of the PC 503, and brings the authentication processing to an end.

As described above, according to this embodiment, it is possible to perform highly secured authentication for an apparatus to-be-authenticated while keeping costs low. In other words, a tamper-resistant chip equipped with a common key encryption technology that is relatively inexpensive is mounted to the to-be-authenticated device, thereby allowing the costs to be kept low. Further, there is no need to mount the tamper-resistant chip to the authentication device, and hence it is possible to perform the highly secured authentication for the apparatus to-be-authenticated even when employing a general-purpose product, such as a PC, to which the tamper-resistant chip is hard to be mounted.

In this embodiment, the apparatus to-be-authenticated is a process cartridge, but may be, for example, a consumable or an apparatus or unit that is regularly replaced, such as a fixing device unit. Further, in this embodiment, the authentication code convertor is mounted to an engine control unit, but may be mounted to, for example, a video control unit including a control device different from the engine control unit. In addition, in this embodiment, an authentication apparatus is the personal computer serving as an external apparatus, but may be, for example, a video control unit serving as a unit included in the image forming apparatus.

Second Embodiment

The description of the first embodiment is directed to the authentication system in which an authentication message transmitted from the to-be-authenticated device to the authentication code convertor is generated by the common key encryption while an authentication message transmitted from the authentication code convertor to the authentication device is generated by the public key encryption. The description of a second embodiment of the present invention is directed to an authentication system in which an authentication message transmitted from the to-be-authenticated device to the authentication code convertor is generated by the common key encryption in the same manner as in the first embodiment while an authentication message transmitted from the authentication code convertor to the authentication device is generated by using one-time common key encryption. Note that, the one-time common key encryption according to this embodiment represents common key encryption in which the common key shared between the authentication code convertor and the authentication device is sequentially changed by, for example, being reset when the image forming apparatus is powered on, and the common key is sequentially generated by the authentication device.

(Configuration of Authentication System of the Image Forming Apparatus)

Figure 5A:
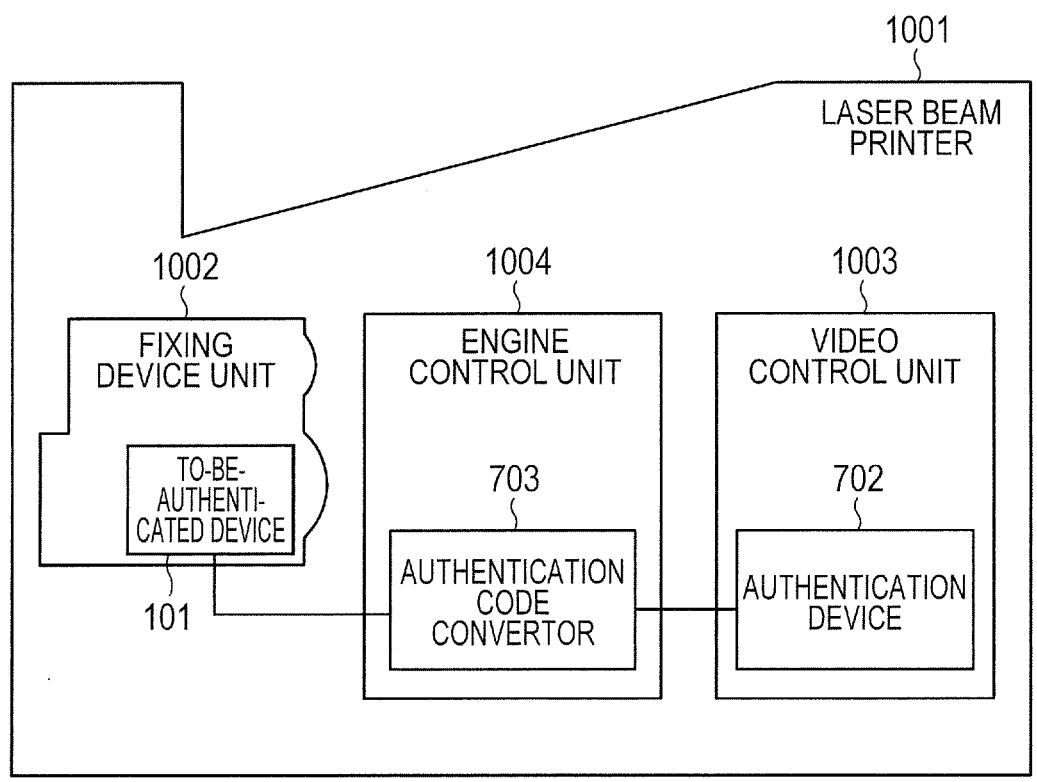
FIG. 5A is a diagram illustrating a schematic configuration of an authentication system according to a second embodiment of the present invention.

FIG. 5A is a diagram illustrating a schematic configuration of the image forming apparatus equipped with the authentication system according to the second embodiment, and illustrates a laser beam printer as an example of the image forming apparatus. In FIG. 5A, a fixing device unit 1002 is a replaceable unit detachably mountable to a laser beam printer main body 1001 (hereinafter referred to as "main body 1001"). A video control unit 1003 is located inside the main body 1001, and issues the drawing order to an engine control unit 1004. The engine control unit 1004 controls the main body 1001 in accordance with the drawing order issued from the video control unit 1003. Here, the engine control unit 1004 and the video control unit 1003 are units provided separately, and are each a unit controlled by a CPU with which each unit is equipped. This embodiment describes a system in which the video control unit 1003 authenticates whether or not the fixing device unit 1002 mounted to the main body 1001 is compatible with the image forming apparatus.

In FIG. 5A, the fixing device unit 1002 is equipped with a to-be-authenticated device 101 for generating a first authentication code serving as encrypted data for authenticating the fixing device unit 1002. When the main body 1001 is powered on, the fixing device unit 1002 transmits the first authentication code to the engine control unit 1004. The engine control unit 1004 is equipped with an authentication code convertor 703, which converts the first authentication code received from the fixing device unit 1002 into a second authentication code that can be authenticated by the video control unit 1003, and transmits the second authentication code to the video control unit 1003. The video control unit 1003 is equipped with an authentication device 702 for authenticating the fixing device unit 1002, which authenticates whether or not the fixing device unit 1002 is compatible based on the second authentication code received from the engine control unit 1004. In this embodiment, the authentication device 702 is not limited to hardware, and may be, for example, software for executing the same functions by the CPU of the video control unit 1003.

(Configurations of to-be-Authenticated Device, Authentication Device, and Authentication Code Convertor)

FIG. 5B is a diagram illustrating configurations of the to-be-authenticated device 101 of the fixing device unit 1002, the authentication device 702 of the video control unit 1003, and the authentication code convertor 703 of the engine control unit 1004.

The to-be-authenticated device 101 is the same as the to-be-authenticated device 101 described in the first embodiment, and hence a description thereof is omitted here.

The authentication device 702 includes a second data transmitting/receiving circuit 706 for transmitting/receiving data to/from the authentication code convertor 703 of the engine control unit 1004, an authentication order part 707 for issuing an order to start authentication, and an authentication part 708 for performing an authentication operation in accordance with the order issued from the authentication order part 707.

An external data transmitter/receiver unit of the authentication code convertor 703 is formed of a third data transmitting/receiving circuit 709 and a fourth data transmitting/receiving circuit 710. The third data transmitting/receiving circuit 709 transmits/receives data to/from the authentication device 702 of the video control unit 1003, and the fourth data transmitting/receiving circuit 710 transmits/receives data to/from the to-be-authenticated device 101 of the fixing device unit 1002. In addition, the authentication code convertor 703 includes an authentication code conversion order part 711 and a second tamper-resistant chip 712. When the fourth data transmitting/receiving circuit 710 receives the first response data from the to-be-authenticated device 101, the authentication code conversion order part 711 issues an authentication code conversion order. The second tamper-resistant chip 712 generates the second response data in accordance with the order issued from the authentication code conversion order part 711.

(Internal Configurations of First and Second Tamper-Resistant Chips and Authentication Part)

Figure 6B:
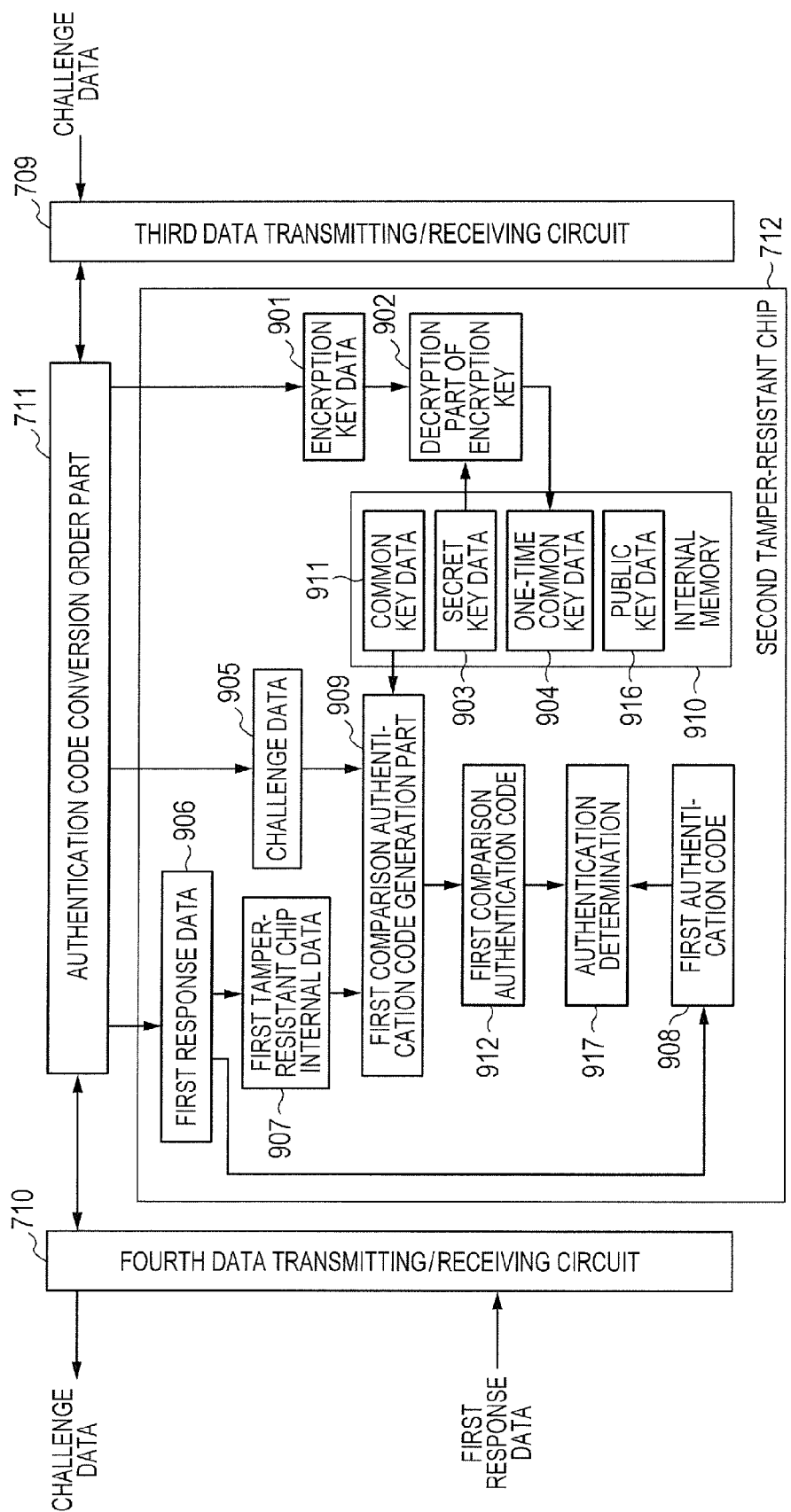

FIGS. 6A and 6B are diagrams illustrating relationships among memories, data, and processing blocks (for example, authentication determination part), which form the first tamper-resistant chip 105 of the to-be-authenticated device 101, the second tamper-resistant chip 712 of the authentication code convertor 703, and the authentication part 708 of the authentication device 702. Here, common key data 205 within an internal memory 202 of the first tamper-resistant chip 105 illustrated in FIG. 6A and common key data 911 within an internal memory 910 of the second tamper-resistant chip 712 illustrated in FIG. 6B, which are described later, have the same data value. The sharing of common key data is performed by, for example, setting the key data that is common, or writing additional information for using the key data that is common, at a time of initializing the first tamper-resistant chip 105 and the second tamper-resistant chip 712.

Further, public key data 916 within the internal memory 910 of the second tamper-resistant chip 712 illustrated in FIG. 6C and public key data 803 within the authentication part 708 illustrated in FIG. 6D, which are described later, have the same data value. The sharing of the public key is performed by, for example, the authentication part 708 reading and acquiring public key data 916, which forms a pair with secret key data 903 retained in the internal memory 910 of the second tamper-resistant chip 712, before sharing of a one-time common key which is described later is executed.

FIG. 6A is a diagram illustrating the relationship among (internal configurations of) the memory, the data, and the processing block (first authentication code generation part) within the first tamper-resistant chip 105 of the to-be-authenticated device 101. FIG. 6A is the same diagram as that of FIG. 3A according to the first embodiment with the operations described in the first embodiment, and hence descriptions thereof are omitted here.

(Internal Configuration of Second Tamper-Resistant Chip)

Next, the internal configuration of the second tamper-resistant chip 712 is described. FIG. 6B is a diagram illustrating the relationship among the memory, the data, and the processing blocks exhibited when the sharing of the one-time common key is performed, when the challenge data received from the authentication device 702 is transmitted to the to-be-authenticated device 101, and when the authentication operation for the first authentication code is performed. FIG. 6C is a diagram illustrating the relationship among the memory, the data, and the processing block exhibited when the first authentication code is converted into the second authentication code. Note that, the same memory and the same data between FIG. 6B and FIG. 6C are denoted by the same reference numerals.

In FIG. 6B, when the encryption key data 901 is received from the authentication device 702 through the third data transmitting/receiving circuit 709, the authentication code conversion order part 711 outputs the encryption key data 901 to the second tamper-resistant chip 712. The second tamper-resistant chip 712 inputs the input encryption key data 901 to a decryption part 902 of an encryption key, uses the secret key data 903 within the internal memory 910 to perform the decryption processing, and decrypted one-time common key data 904 is stored in the internal memory 910. Accordingly, one-time common key data is shared between the authentication part 708 of the authentication device 702 and the second tamper-resistant chip 712 of the authentication code convertor 703.

Further, when the challenge data is received from the authentication device 702 through the third data transmitting/receiving circuit 709, the authentication code conversion order part 711 outputs the challenge data to the second tamper-resistant chip 712. Further, the authentication code conversion order part 711 transmits challenge data 905 to the to-be-authenticated device 101 through the fourth data transmitting/receiving circuit 710. Then, the authentication code conversion order part 711 monitors an input of the first response data made in response to the challenge data from the to-be-authenticated device 101 through the fourth data transmitting/receiving circuit 710. When the first response data is input, the authentication code conversion order part 711 outputs an input first response data 906 to the second tamper-resistant chip 712 while issuing the authentication code conversion order thereto. The second tamper-resistant chip 712, which has received the authentication code conversion order, divides the input first response data 906 into a first tamper-resistant chip internal data 907 and a first authentication code 908. The first tamper-resistant chip internal data 907 obtained by the dividing is input to a first comparison authentication code generation part 909 along with the challenge data 905 received from the authentication device 702. The first comparison authentication code generation part 909 performs the processing for combining the two input pieces of data. The combined data is subjected to the encryption processing with the common key data 911 stored in the internal memory 910 of the second tamper-resistant chip 712, thereby generating a first comparison authentication code 912. Here, the first comparison authentication code generation part 909 performs the same processing as the first authentication code generation part 203 illustrated in FIG. 6A. The first comparison authentication code 912 generated by the encryption processing is compared with the first authentication code 908 obtained by dividing the first response data 906 at an authentication determination part 917. When the two pieces of data are identical with each other, the second tamper-resistant chip 712 advances to processing for generating the second response data illustrated in FIG. 6C. When the two pieces of data are not identical, the second tamper-resistant chip 712 outputs an authentication error to the authentication code conversion order part 711.

When the first comparison authentication code 912 and the first authentication code 908 are identical with each other, in FIG. 6C, the second tamper-resistant chip 712 inputs the challenge data 905 and the first tamper-resistant chip internal data 907 to a second authentication code generation part 913. The second authentication code generation part 913 performs the processing for combining the two pieces of data. The combined data is subjected to the encryption processing with the one-time common key data 904 stored within the internal memory 910 serving as a second encryption key. Any encryption processing can be executed here as long as the authentication code of the input data is generated by common key encryption as in the case of the above-mentioned Message Authentication Codes (MACs). A second authentication code 914 generated by the encryption processing forms a second response data 915 together with the first tamper-resistant chip internal data 907 obtained by dividing the first response data 906. Then, the second tamper-resistant chip 712 outputs the second response data 915 to the authentication code conversion order part 711. The authentication code conversion order part 711 transmits the input second response data 915 to the authentication device 702 through the third data transmitting/receiving circuit 709.

(Internal Configuration of Authentication Part)

Figure 6D:
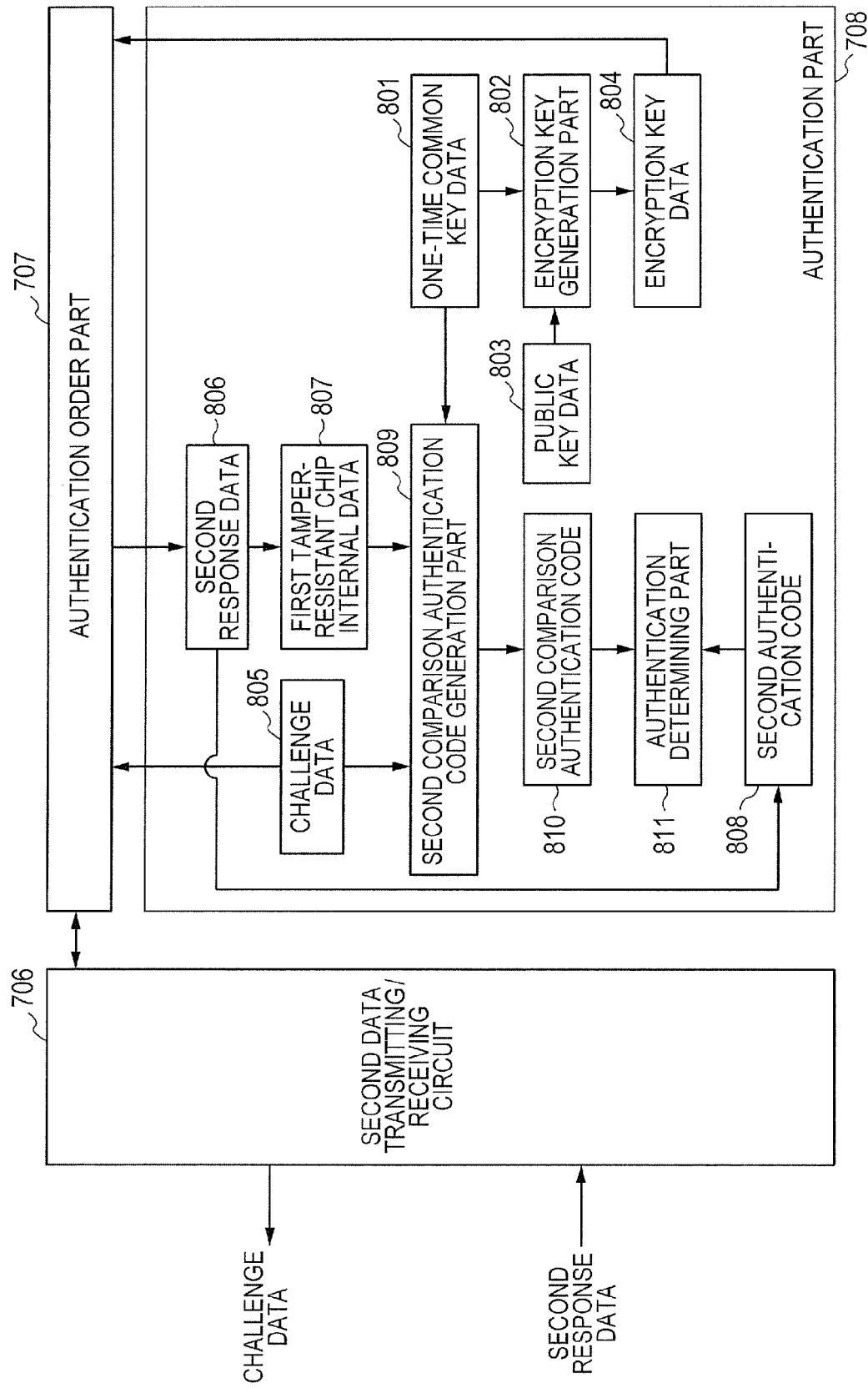

FIG. 6D is a diagram illustrating the relationship among (internal configurations of) the memory, the data, and the processing blocks (such as authentication determination part) within the authentication part 708 of the authentication device 702.

In FIG. 6D, when a sharing designation order for a one-time common key is output from the authentication order part 707 to the authentication part 708, the authentication part 708 uses the random number component to generate one-time common key data 801. Then, at the authentication part 708, the encryption is performed for the generated one-time common key data 801 with the public key data 803 by an encryption key generation part 802, and generated encryption key data 804 is output to the authentication order part 707. The authentication order part 707 transmits the input encryption key data 804 to the authentication code convertor 703 through the second data transmitting/receiving circuit 706. Then, as described above, in the second tamper-resistant chip 712 of the authentication code convertor 703, the one-time common key data 801 obtained when the encryption key data 804 is decrypted by the decryption part 902 of the encryption key is stored, and the one-time common key data is shared. After processing for sharing the one-time common key is completed, the authentication order part 707 subsequently outputs the order to start the authentication to the authentication part 708.

In FIG. 6D, when the order to start the authentication is issued from the authentication order part 707, the authentication part 708 generates challenge data 805 and outputs the challenge data 805 to the authentication order part 707. The authentication order part 707 outputs the input challenge data 805 to the second data transmitting/receiving circuit 706, and monitors an input of the second response data 806 made in response to the challenge data 805 from the authentication code convertor 703 through the second data transmitting/receiving circuit 706. When the second response data 806 is input, the authentication order part 707 outputs the input second response data 806 to the authentication part 708, and issues an authentication order thereto. The authentication part 708, which has received the authentication order, divides the input second response data 806 into a first tamper-resistant chip internal data 807 and a second authentication code 808. The first tamper-resistant chip internal data 807 obtained by the dividing is input to a second comparison authentication code generation part 809 along with the challenge data 805. The second comparison authentication code generation part 809 performs the processing for combining the two input pieces of data. Then, at the second comparison authentication code generation part 809, the combined data is subjected to the encryption processing with the one-time common key data 801, thereby outputting a second comparison authentication code 810. An authentication determination part 811 determines whether or not the output second comparison authentication code 810 and the second authentication code 808 are identical with each other, and the authentication part 708 outputs the authentication completed to the authentication order part 707 when the two pieces of data are identical with each other, and otherwise, outputs the authentication error thereto.

(Flow of Processing from Authentication Start to Authentication Determination)

Figure 7A:
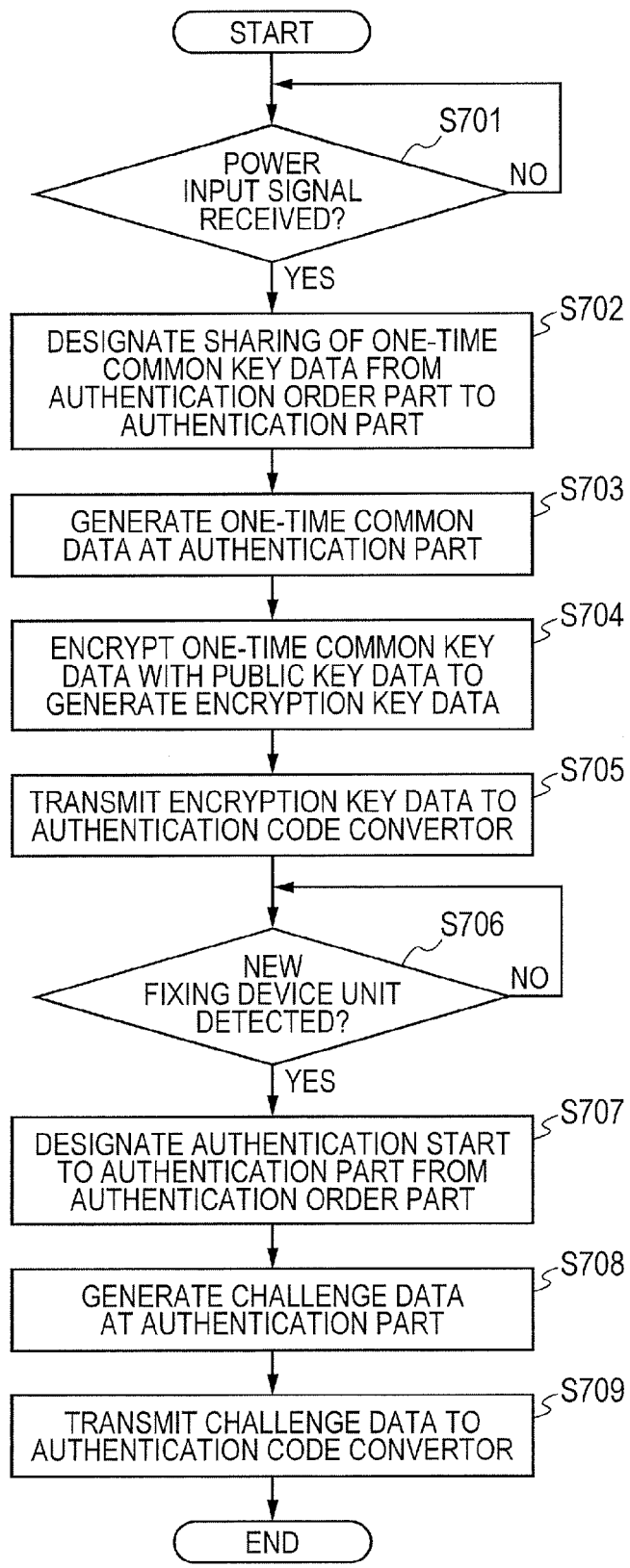
FIGS. 7A and 7B are flowcharts illustrating operations of authentication processing performed by the authentication device according to the second embodiment.
Figure 7B:
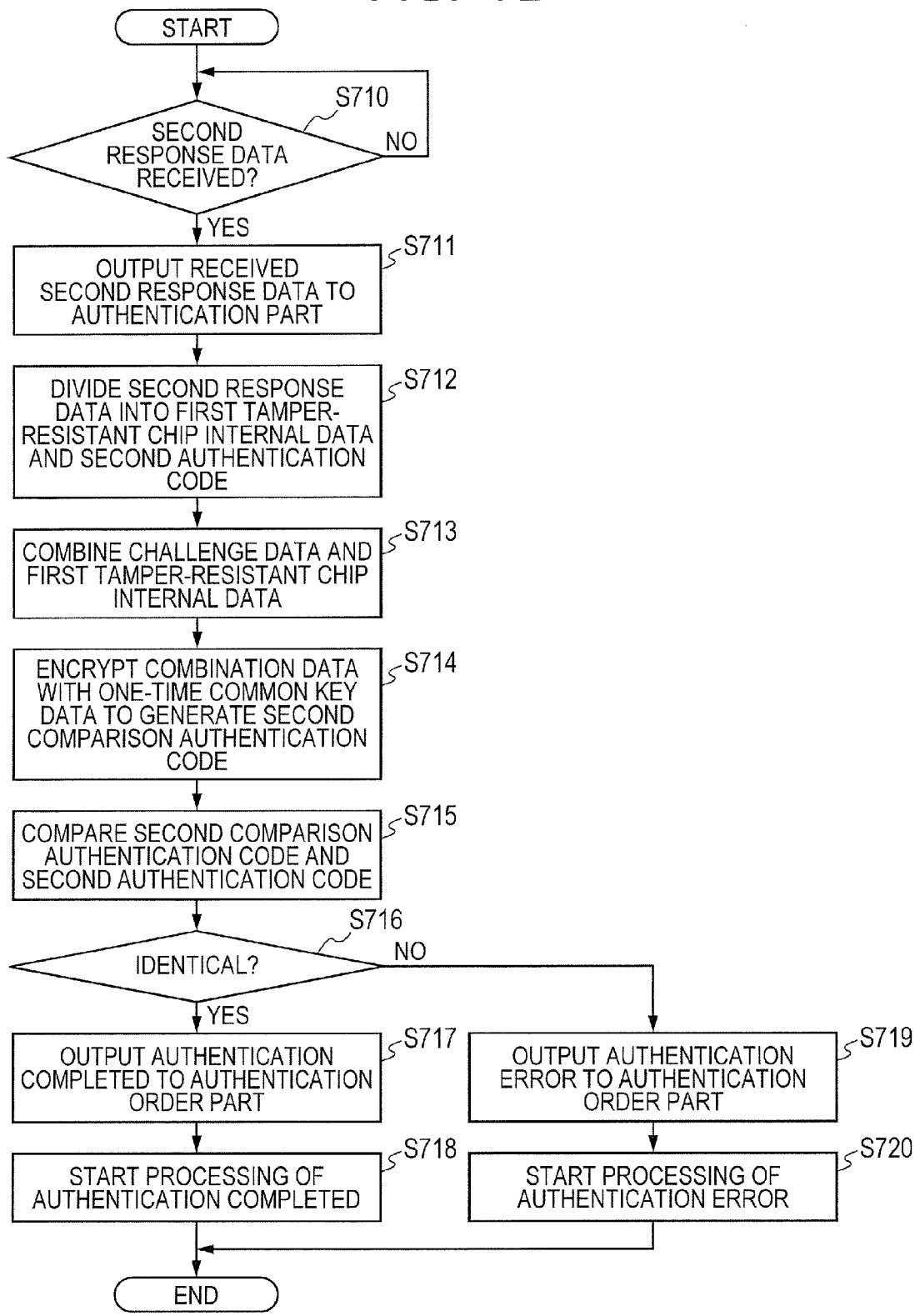
Figure 7D:
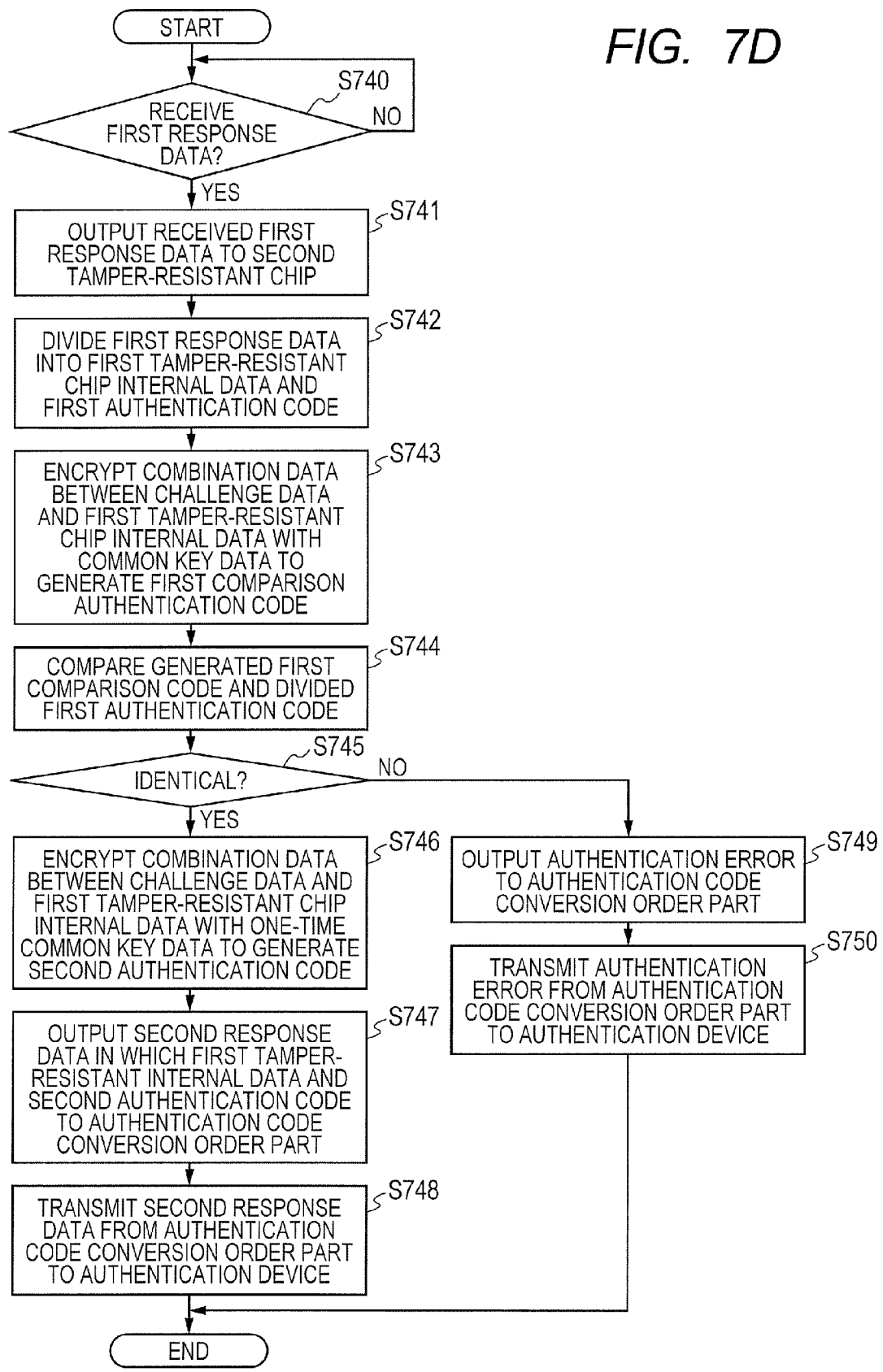
Figure 7E:
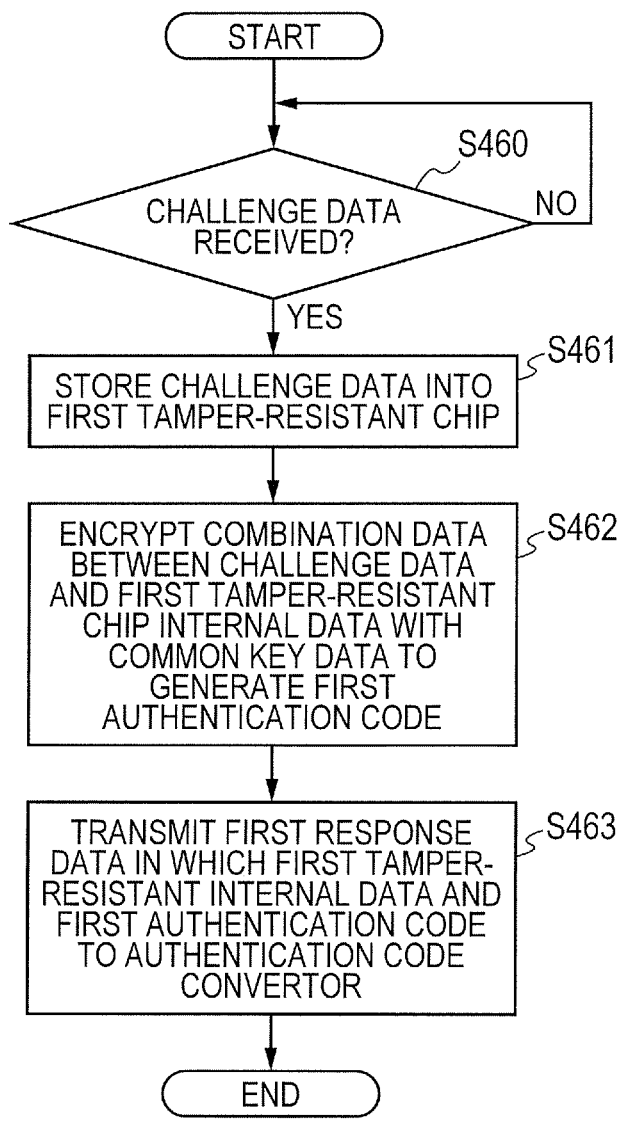
FIG. 7E is a flowchart illustrating an operation of the authentication processing performed by the to-be-authenticated device according to the second embodiment.

Next, a flow of processing from an authentication start to the authentication determination is described with reference to flowcharts of FIGS. 7A to 7E. FIGS. 7A and 7B are flowcharts illustrating operations of authentication processing performed by the authentication device 702. FIG. 7A illustrates the operation of sharing of the one-time common key data and the operation from the authentication start to transmission of the challenge data, and FIG. 7B illustrates the operation for performing the authentication determination after receiving the second response data. FIGS. 7C and 7D are flowcharts illustrating operations of the authentication processing performed by the authentication code convertor 703. FIG. 7C illustrates the operation of sharing of the one-time common key data and the operation from reception of the challenge data to the transmission of the challenge data, and FIG. 7D illustrates the operation from the reception of the first response data to the transmission of the second response data. FIG. 7E is a flowchart illustrating an operation of the authentication processing performed by the to-be-authenticated device 101, and illustrates the operation from the reception of the challenge data to the transmission of the first response data. With reference to the above-mentioned flowcharts, operations of the respective parts are described below from the authentication start to an end of the authentication determination in the authentication system according to this embodiment.

(Processing Performed by Authentication Device (Part 1))

In FIG. 5A, when detecting that the main body 1001 has been powered on, the engine control unit 1004 transmits a power input signal to the video control unit 1003. In FIG. 7A, in S701, the video control unit 1003 determines whether or not the main body 1001 has been powered on based on whether or not the power input signal has been received. When the second data transmitting/receiving circuit 706 receives the power input signal, the procedure advances to the processing of S702, and when the power input signal has not been received yet, the processing of S701 is repeated. In S702, when receiving the power input signal through the second data transmitting/receiving circuit 706, the authentication order part 707 designates the processing for sharing the one-time common key data to the authentication part 708. In S703, the authentication part 708, which has received a sharing designation for the one-time common key, generates the one-time common key data 801 including the random number component. In S704, the one-time common key data 801 is input to the encryption key generation part 802, and is encrypted with the public key data 803 at the encryption key generation part 802, thereby generating and outputting the encryption key data 804. In S705, the authentication part 708 outputs the encryption key data 804 output from the encryption key generation part 802 to the authentication order part 707, and the authentication order part 707 transmits the encryption key data 804 to the authentication code convertor 703 through the second data transmitting/receiving circuit 706.

In FIG. 5A, when detecting that a new fixing device unit 1002 has been inserted into the main body 1001, the engine control unit 1004 transmits a detection signal to the video control unit 1003. In FIG. 7A, in S706, the video control unit 1003 determines whether or not the engine control unit 1004 has detected the mounting of the new fixing device unit 1002 based on whether or not the detection signal has been received. When the second data transmitting/receiving circuit 706 receives the detection signal, the procedure advances to the processing of S707, and when the detection signal has not been received yet, the processing of S706 is repeated until the detection signal is received. In S707, when it is notified by the second data transmitting/receiving circuit 706 that the detection signal has been received, the authentication order part 707 designates the authentication start to the authentication part 708. In S708, the authentication part 708, which has received the order to start the authentication, generates the challenge data 805 including the random number component, and outputs the challenge data 805 to the authentication order part 707. In S709, the authentication order part 707 transmits the challenge data 805 to the authentication code convertor 703 of the engine control unit 1004 through the second data transmitting/receiving circuit 706.

(Processing Performed by Authentication Code Convertor (Part 1))

When the main body 1001 is powered on, the engine control unit 1004 monitors a transmission of the one-time common key data from the video control unit 1003. In FIG. 7C, in S730, a third data transmitting/receiving circuit 709 of the authentication code convertor 103 of the engine control unit 1004 determines whether or not encryption key data has been received from the authentication device 702 of the video control unit 1003. When the third data transmitting/receiving circuit 709 receives the encryption key data, the procedure advances to the processing of S731, and when the encryption key data has not been received yet, the processing of S730 is repeated. In S731, the authentication code conversion order part 711, which has received the encryption key data 804 through the third data transmitting/receiving circuit 109, outputs the received encryption key data 804 to the second tamper-resistant chip 712. It is assumed here that the encryption key data 804 received from the video control unit 1003 is referred to as "encryption key data 901" inside the second tamper-resistant chip 712. The second tamper-resistant chip 712 inputs the input encryption key data 901 to the decryption part 902 of the encryption key, and at the decryption part 902 of the encryption key, the encryption key data 901 is subjected to the decryption processing with the secret key data 903 within the internal memory 910. The decrypted one-time common key data 904 is stored in the internal memory 910. By this processing, the one-time common key data 904 is shared between the authentication part 708 of the video control unit 1003 and the second tamper-resistant chip 712 of the engine control unit 1004.

In S732, the third data transmitting/receiving circuit 709 determines whether or not the challenge data has been received from the authentication device 702 of the video control unit 1003. When the third data transmitting/receiving circuit 709 receives the challenge data, the procedure advances to the processing of S733, and when the challenge data has not been received yet, the processing of S732 is repeated. In S733, the authentication code conversion order part 711, which has received the challenge data through the third data transmitting/receiving circuit 709, outputs the received challenge data to the second tamper-resistant chip 712. The second tamper-resistant chip 712, which has the received challenge data input from the authentication code conversion order part 711, stores the received challenge data as the challenge data 905. Here, the challenge data 805 generated by the authentication part 708 of the authentication device 702 of the video control unit 1003 and the challenge data 905 indicate the same data. In S734, the authentication code conversion order part 711 transmits the challenge data to the to-be-authenticated device 101 of the fixing device unit 1002 through the fourth data transmitting/receiving circuit 710.

(Processing Performed by to-be-Authenticated Device)

FIG. 7E is a flowchart illustrating an operation of the authentication processing performed by the to-be-authenticated device 101. FIG. 7E illustrates the operation from the reception of the challenge data from the authentication code convertor 703 to the transmission of the first response data to the authentication code convertor 703. FIG. 7E is the same diagram as that of FIG. 4E according to the first embodiment. The transmission source of the challenge data and the transmission destination of the first response data are the authentication code convertor 703 in this embodiment instead of being the authentication code convertor 103 in the first embodiment, except which the operation of the authentication code convertor 703 is the same as that of the authentication code convertor 103 according to the first embodiment. Hence, a description of the operation illustrated in FIG. 7E is omitted here.

(Processing Performed by Authentication Code Convertor (Part 2))

In FIG. 7D, in S740, the fourth data transmitting/receiving circuit 710 of the authentication code convertor 703 of the engine control unit 1004 determines whether or not the first response data has been received from the to-be-authenticated device 101 of the fixing device unit 1002. When the fourth data transmitting/receiving circuit 710 receives the first response data, the procedure advances to the processing of S741, and when the first response data has not been received yet, the processing of S740 is repeated. In S741, the authentication code conversion order part 711, which has received the first response data through the fourth data transmitting/receiving circuit 710, outputs the first response data to the second tamper-resistant chip 712 while issuing the authentication code conversion order. In S742, the second tamper-resistant chip 712, which has the first response data input thereto, stores the input first response data as the first response data 906. Here, the first response data 207 within the first tamper-resistant chip 105 of the to-be-authenticated device 101 of the fixing device unit 1002 and the first response data 906 stored in the second tamper-resistant chip 712 indicate the same data. The input first response data 906 is divided into the first tamper-resistant chip internal data 907 and the first authentication code 908 by the second tamper-resistant chip 712.

In 743, the first tamper-resistant chip internal data 907 is input to the first comparison authentication code generation part 909 along with the challenge data 905. At the first comparison authentication code generation part 909, the processing for combining the challenge data 905 and the first tamper-resistant chip internal data 907 that have been input is performed. In addition, at the first comparison authentication code generation part 909, the obtained combination data is subjected to the encryption processing with the common key data 911 stored in the internal memory 910 of the second tamper-resistant chip 112, thereby generating the first comparison authentication code 912.

In S744, at the authentication determination part 917, the generated first comparison authentication code 912 and the first authentication code 908 are compared with each other. In S745, the authentication determination part 917 determines whether or not the first comparison authentication code 912 and the first authentication code 908 are identical with each other. The authentication determination part 912 advances to S746 when the two pieces of data are identical with each other, and otherwise, advances to S749. In S749, the authentication determination part 917 outputs the authentication error to the authentication code conversion order part 711. In S750, the authentication code conversion order part 111, which has received the authentication error from the authentication determination part 917, notifies the authentication device 702 of the video control unit 1003 of information on the authentication error through the third data transmitting/receiving circuit 709. Note that, the authentication device 702 of the video control unit 1003, which has received the authentication error, executes processing of the authentication error (S720) described later, and brings the authentication processing to an end.

In S746, the first comparison authentication code 912 and the first authentication code 908 are identical with each other, and hence the second tamper-resistant chip 712 inputs the first tamper-resistant chip internal data 907 and the challenge data 905 to the second authentication code generation part 913. At the second authentication code generation part 913, the processing for combining the challenge data 905 and the first tamper-resistant chip internal data 907 that have been input is performed. Then, at the second authentication code generation part 913, the obtained combination data is subjected to the encryption processing with the one-time common key data 904 stored in the internal memory 910, thereby generating the second authentication code 914. In S747, the second tamper-resistant chip 712 combines the generated second authentication code 914 and the first tamper-resistant chip internal data 907 to generate the second response data 915, and outputs the second response data 915 to the authentication code conversion order part 711. In S748, the authentication code conversion order part 711 transmits the second response data 915 input from the second tamper-resistant chip 712 to the authentication device 702 of the video control unit 1003 through the third data transmitting/receiving circuit 709.

(Processing Performed by Authentication Device (Part 2))

In FIG. 7B, in S710, the second data transmitting/receiving circuit 706 of the authentication device 702 of the video control unit 1003 determines whether or not the second response data has been received from the authentication code convertor 703 of the engine control unit 1004. When the second data transmitting/receiving circuit 706 receives the second response data, the procedure advances to the processing of S711, and when the second response data has not been received yet, the processing of S710 is repeated. In S711, the authentication order part 707, which has received the second response data through the second data transmitting/receiving circuit 706, outputs the second response data 806 to the authentication part 708 while issuing a last authentication processing order. In S712, the authentication part 708 stores the second response data output from the authentication order part 707 as the second response data 806. Here, the second response data 915 within the second tamper-resistant chip of the authentication code convertor 703 of the engine control unit 1004 and the second response data 806 stored in the authentication part 708 indicate the same data. Further, the authentication part 708 divides the input second response data 806 into the first tamper-resistant chip internal data 807 and the second authentication code 808. In S713, the first tamper-resistant chip internal data 807 is input to the second comparison authentication code generation part 809 along with the challenge data 805. At the second comparison authentication code generation part 809, the processing for combining the challenge data 805 and the first tamper-resistant chip internal data 807 that have been input is performed to generate the combination data. In S714, the combination data obtained by the combination processing is subjected to the encryption processing with the one-time common key data 801 by the second comparison authentication code generation part 809, thereby generating the second comparison authentication code 810. In S715, the generated second comparison authentication code 810 and the second authentication code 808 are input to the authentication determination part 811, and the authentication determination part 811 compares the second comparison authentication code 810 and the second authentication code 808. In S716, the authentication determination part 811 determines whether or not the second comparison authentication code 810 and the second authentication code 808 are identical with each other. The authentication determination part 811 advances to S717 when the two pieces of data are identical with each other, and otherwise, advances to S719. In S719, the authentication determination part 811 outputs the authentication error to the authentication order part 707. In S720, the authentication order part 707, which has received the authentication error, executes the processing of the authentication error, for example, displays the authentication error on a display part of the main body 1001, and brings the authentication processing to an end. In S717, the authentication determination part 811 outputs the authentication completed to the authentication order part 707. In S718, the authentication order part 707, which has received the authentication completed, executes processing of the authentication completed, for example, displays the authentication completed on the display part of the main body 1001, and brings the authentication processing to an end.

As described above, according to this embodiment, it is possible to perform highly secured authentication for an apparatus to-be-authenticated while keeping costs low. In other words, a tamper-resistant chip equipped with a common key encryption technology that is relatively inexpensive is mounted to the to-be-authenticated device, thereby allowing the costs to be kept low. Further, there is no need to mount the tamper-resistant chip to the authentication device, and hence it is possible to keep costs even lower and to perform the highly secured authentication for the apparatus to-be-authenticated with the use of the authentication system built within the image forming apparatus.

In this embodiment, the apparatus to-be-authenticated is a fixing device unit, but may be, for example, a consumable or an apparatus or unit that is regularly replaced, such as a process cartridge. Further, in this embodiment, the authentication code convertor is mounted to an engine control unit, and the authentication device is mounted to a video control unit. The authentication code convertor may be mounted to, for example, the video control unit, and the authentication device may be mounted to, for example, the engine control unit. In addition, in this embodiment, an authentication apparatus is the video control unit, but the authentication apparatus may be, for example, a personal computer serving as an external apparatus.

Other Embodiments

In the above-mentioned first and second embodiments, the authentication code convertor performs the authentication determination for the first response data received from the to-be-authenticated device, and when the authentication error is detected, the authentication code convertor notifies the authentication device of the authentication error without having the second response data generated. In other embodiments corresponding to the first and second embodiments described below, the authentication code convertor encrypts data including an authentication result, without performing the authentication determination, and transmits the data to the authentication device, while the authentication device performs the authentication determination including the authentication error in the authentication code convertor.

The authentication code convertor 103 according to the first embodiment compares the first comparison authentication code and the first authentication code in S444 of FIG. 4D, determines the comparison result in S445, and when the authentication error is obtained, advances to S449 to perform the processing for outputting the authentication error to the authentication code conversion order part 111. In another embodiment corresponding to the first embodiment, after the first comparison authentication code and the first authentication code are compared in S444, the procedure advances to the processing of S446. Then, in S446, the second authentication code generation part 410 encrypts the combination data of the authentication result obtained in S444, the challenge data 401, and the first tamper-resistant chip internal data 403 with the secret key data 408 to generate the second authentication code 411.

Subsequently, in the authentication device 102 according to the first embodiment, in S414 of FIG. 4B, the authentication code decryption part 307 subjects the second authentication code 304 to the decryption processing with the public key data 308 to generate the second comparison authentication code 309. In the another embodiment corresponding to the first embodiment, in S414, the authentication code decryption part 307 subjects the second authentication code 304 to the decryption processing with the public key data 308 to generate the second comparison authentication code 309 and the authentication result obtained by the authentication code convertor. Then, based on the authentication result obtained by the authentication code convertor 103, the procedure advances to the processing of the authentication error of S419 in the case of the authentication error, and in the case of the authentication completed, the procedure advances to S415, in which the authentication device 102 may perform processing for the authentication determination.

Also in the case of another embodiment corresponding to the second embodiment, it is possible to perform the processing for the authentication determination in the same manner as in the above-mentioned another embodiment corresponding to the first embodiment. The authentication code convertor 703 according to the second embodiment compares the first comparison authentication code 912 generated by the authentication determination part 917 and the first authentication code 908 in S744 of FIG. 7D, determines the comparison result in S745, and advances to S749 when the authentication error is obtained. In S749, the processing for outputting the authentication error to the authentication code conversion order part 711 is performed. In the another embodiment corresponding to the second embodiment, after the first comparison authentication code and the first authentication code are compared in S744, the procedure advances to the processing of S746. Then, in S746, the second authentication code generation part 913 encrypts the combination data of the authentication result obtained in S744, the challenge data 905, and the first tamper-resistant chip internal data 907 with the one-time common key data 904 to generate the second authentication code 914.

Subsequently, in the authentication device 702 according to the second embodiment, in S713 of FIG. 7B, the first tamper-resistant chip internal data 807 is input to the second comparison authentication code generation part 809 along with the challenge data 805. At the second comparison authentication code generation part 809, the processing for generating the combination data obtained by combining the challenge data 805 and the first tamper-resistant chip internal data 807 that have been input is performed. In the case of the another embodiment corresponding to the second embodiment, in S713, the first tamper-resistant chip internal data 807, the challenge data 805, and the authentication result data, which is obtained in the case of the authentication completed in the second tamper-resistant chip 712, are input to the second comparison authentication code generation part 809. Then, at the second comparison authentication code generation part 809, the processing for generating the combination data obtained by combining the input three pieces of data is performed. Then, in S715, the second comparison authentication code generated by the second comparison authentication code generation part 809 encrypting the combination data obtained by combining the three pieces of data is compared with the second authentication code by the authentication determination part 811. In S716, the authentication completed or the authentication error is determined based on the comparison result. When the second comparison authentication code and the second authentication code are identical with each other, it is determined that the authentication completed has been determined also in the authentication code convertor 703. When the second comparison authentication code and the second authentication code are not identical with each other, it is determined that the authentication error has been determined in the authentication code convertor 703, or that the authentication completed has been determined in the authentication code convertor 703 but the authentication error has been determined in the authentication device 702.

As described above, according to the other embodiments, it is also possible to perform the highly secured authentication for the apparatus to-be-authenticated while keeping the costs low. In particular, the authentication device can centrally perform the authentication determination by transmitting the authentication result to the authentication device, irrespective of whether or not the authentication has been completed, without determining the authentication result of the to-be-authenticated device in the authentication code convertor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-010800, filed on Jan. 24, 2013, which is hereby incorporated by reference herein in its entirety.

What is claimed is:

1. An authentication system, comprising:
a to-be-authenticated device configured to generate first authentication data;
an authentication code convertor configured to convert the first authentication data generated by the to-be-authenticated device into a second authentication data; and
an authentication device configured to perform authentication of the to-be-authenticated device based on the second authentication data converted by the authentication code convertor,
wherein the first authentication data includes a first authentication code and predetermined data included in the to-be-authenticated device, the to-be-authenticated device being configured to calculate the first authentication code using challenge data output from the authentication device in accordance with a common key encryption method using a common key,
wherein the second authentication data includes a second authentication code and the predetermined data included in the to-be-authenticated device, the authentication code convertor being configured to connect the predetermined data and the challenge data as second connection data, encrypt the second connection data as a second authentication code in accordance with a public key using a private key, and output the second authentication data to the authentication device, and
wherein the authentication device is configured to decrypt the second authentication code of the second authentication data using a public key, and to perform authentication of the to-be-authenticated device using a decrypted result.

2. An authentication system according to claim 1,
wherein the authentication device has the public key forming a pair with the private key comprised in the authentication code convertor, and
wherein the authentication device outputs the common key encrypted with the public key to the authentication code convertor; and
the authentication code convertor obtains the common key by decrypting the encrypted common key output from the authentication device with the private key.

3. An authentication system according to claim 2, wherein the common key comprises a one-time common key; and
wherein the authentication device changes the one-time common key by sequentially generating a new common key and outputting the new common key to the authentication code convertor.

4. An authentication system according to claim 1, wherein the authentication code convertor performs the authentication of the to-be-authenticated device based on the first authentication data, and when the authentication of the to-be-authenticated device is completed, outputs the second authentication data to the authentication device.

5. An authentication system according to claim 1, wherein the authentication code into which the second authentication data is encrypted further comprises an authentication result obtained when the authentication code convertor performs the authentication of the to-be-authenticated device based on the first authentication data; and
the authentication code convertor performs the authentication of the to-be-authenticated device based on the first authentication data, and outputs the second authentication data to the authentication device irrespective of whether or not the authentication of the to-be-authenticated device has been completed.

6. An authentication system according to claim 1, wherein the to-be-authenticated device is provided to one of an apparatus and a unit that is replaceable and is provided to an image forming apparatus for forming an image on a sheet.

7. An authentication system according to claim 1, wherein the authentication code convertor is provided to a unit comprising a control unit provided to an image forming apparatus for forming an image on a sheet.

8. An authentication system according to claim 1, wherein the authentication device is provided to a unit comprising a control unit provided to an image forming apparatus for forming an image on a sheet.

9. An authentication system according to claim 1, wherein the authentication device is provided to an external apparatus connected to an image forming apparatus for forming an image on a sheet.

10. An image forming apparatus in which a unit including a to-be-authenticated device is detachably mountable, wherein an image is formed by the unit of the image forming apparatus, comprising:
an authentication code convertor configured to convert the first authentication data generated by the to-be-authenticated device into second authentication data; and
an authentication device configured to perform authentication of the to-be-authenticated device based on the second authentication data converted by the authentication code convertor,
wherein the to-be-authenticated device is configured to generate first authentication data, the first authentication data includes a first authentication code and predetermined data included in the to-be-authenticated device, the to-be-authenticated device being configured to calculate the first authentication code using challenge data output from the authentication device in accordance with a common key encryption method using a common key,
wherein the second authentication data includes a second authentication code and the predetermined data included in the to-be-authenticated device, the authentication code convertor being configured to connect the predetermined data and the challenge data as second connection data, encrypt the second connection data as a second authentication code in accordance with a public key encryption method using a private key, and output the second authentication data to the authentication device, and
wherein the authentication device is configured to decrypt the second authentication code of the second authentication data using a public key, and to perform authentication of the to-be-authenticated device using a decrypted result.

11. The image forming apparatus according to claim 10, wherein the unit is a process cartridge.

12. The image forming apparatus according to claim 10, wherein the unit is a fixing unit.

13. An authentication system, comprising:
an authentication device configured to transmit challenge data;
a to-be-authenticated device having predetermined data and a common key, the to-be-authenticated device configured to operate on the challenge data transmitted from the authentication device and the predetermined data with the common key to generate a first authentication code as a calculation result, and transmit a first response data including the first authentication code and the predetermined data; and an authentication code convertor configured to operate on the predetermined data of the first response data transmitted from the to-be-authenticated device and the challenge data transmitted from the authentication device with a private key to generate a second authentication code as a calculation result, and transmit the second response data including the second authentication code and the predetermined data, wherein the authentication device performs authentication by the second response data transmitted from the authentication code convertor and the challenge data.

14. An authentication system according to claim 12, wherein the authentication code convertor performs a calculation with the predetermined data of the first response data transmitted from the to-be-authenticated device using the common key, compares a comparison first authentication code resulting from the calculation with the first authentication code of the first response data and performs authentication of the to-be-authenticated device according to the comparison result.

15. An image forming apparatus in which a unit including a to-be-authenticated device is detachably mountable, wherein an image is formed by the unit of the image forming apparatus, comprising:

an authentication device configured to transmit challenge data;

a to-be-authenticated device having predetermined data and a common key, the to-be-authenticated device configured to operate on the challenge data transmitted from the authentication device and the predetermined data using the common key to generate a first authentication code as a calculation result, and transmit first response data including the first authentication code and the predetermined data; and an authentication code convertor configured to operate on the predetermined data of the first response data transmitted from the to-be-authenticated device and the challenge data transmitted from the authentication device with a private key to generate a second authentication code as a calculation result, and transmit second response data including the second authentication code and the predetermined data, wherein the authentication device performs authentication using the second response data transmitted from the authentication code convertor and the challenge data.

16. A to-be-authenticated device according to claim 15, wherein the authentication code convertor performs a calculation with the predetermined data of the first response data transmitted from the to-be-authenticated device using the common key, compares a comparison first authentication code resulting from the calculation with the first authentication code of the first response data and performs authentication of the to-be-authenticated device according to the comparison result.

17. An authentication system, comprising:

an authentication device configured to transmit challenge data;

a to-be-authenticated device having predetermined data and a common key, the to-be-authenticated device configured to operate on the challenge data transmitted from the authentication device and the predetermined data using the common key to generate a first authentication code as a calculation result, and transmit a first response data including the first authentication code and the predetermined data; and an authentication code convertor configured to operate on the predetermined data of the first response data transmitted from the to-be-authenticated device and the challenge data transmitted from the authentication device using a one-time common key encrypted by a public key to generate a second authentication code as a calculation result, and transmit second response data including the second authentication code and the predetermined data, wherein the authentication device performs authentication using the second response data transmitted from the authentication code convertor, the challenge data and the one-time common key.

18. An authentication system according to claim 17, wherein the authentication code convertor performs a calculation with the predetermined data of the first response data transmitted from the to-be-authenticated device using the common key, compares a comparison first authentication code resulting from the calculation with the first authentication code of the first response data and performs authentication of the to-be-authenticated device according to the comparison result.

19. An image forming apparatus in which a unit including a to-be-authenticated device is detachably mountable, wherein an image is formed by the unit of the image forming apparatus, comprising:

an authentication device configured to transmit challenge data;

a to-be-authenticated device having predetermined data and a common key, the to-be-authenticated device configured to operate on the challenge data transmitted from the authentication device and the predetermined data using the common key to generate a first authentication code as a calculation result, and transmit first response data including the first authentication code and the predetermined data; and an authentication code convertor configured to perform a calculation with the predetermined data of the first response data transmitted from the to-be-authenticated device and the challenge data transmitted from the authentication device using a one-time common key encrypted by a public key to generate a second authentication code as a calculation result, and transmit the second response data including the second authentication code and the predetermined data, wherein the authentication device performs authentication using the second response data transmitted from the authentication code convertor, the challenge data and the one-time common key.

20. A to-be-authenticated device according to claim 19, wherein the authentication code convertor performs a calculation with the predetermined data of the first response data transmitted from the to-be-authenticated device using the common key, compares a comparison first authentication code resulting from the calculation with and the first authentication code of the first response data and performs authentication of the to-be-authenticated device according to the comparison result.

* * * * *